United States Patent
Lee et al.

(10) Patent No.: US 12,298,865 B2
(45) Date of Patent: May 13, 2025

(54) BACKUP AND RESTORE OF FILES WITH MULTIPLE HARD LINKS

(71) Applicant: Rubrik, Inc., Palo Alto, CA (US)

(72) Inventors: Looi Chow Lee, Mountain View, CA (US); Ziqi Liu, Campbell, CA (US); Guilherme Menezes, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 119 days.

(21) Appl. No.: 17/869,703

(22) Filed: Jul. 20, 2022

(65) Prior Publication Data

US 2022/0365852 A1    Nov. 17, 2022

Related U.S. Application Data

(63) Continuation of application No. 16/264,523, filed on Jan. 31, 2019, now Pat. No. 11,474,912.

(51) Int. Cl.
  *G06F 11/14* (2006.01)

(52) U.S. Cl.
  CPC ...... *G06F 11/1469* (2013.01); *G06F 11/1471* (2013.01); *G06F 2201/80* (2013.01); *G06F 2201/82* (2013.01)

(58) Field of Classification Search
  CPC ............. G06F 11/1469; G06F 11/1471; G06F 2201/80; G06F 2201/82; G06F 11/1453; G06F 11/1451; G06F 2201/815; G06F 2201/84
  USPC ........................................................ 707/685
  See application file for complete search history.

(56) References Cited

U.S. PATENT DOCUMENTS

| | | | |
|---|---|---|---|
| 5,418,945 A | * | 5/1995 | Carter ................... G06F 16/275 710/200 |
| 6,339,785 B1 | | 1/2002 | Feigenbaum |
| 6,513,051 B1 | * | 1/2003 | Bolosky ............. G06F 11/1453 714/E11.122 |
| 6,938,039 B1 | | 8/2005 | Bober et al. |
| 7,966,293 B1 | | 6/2011 | Owara et al. |

(Continued)

OTHER PUBLICATIONS

Meyer, Dutch T., "Storage System Tracing and Analysis", Doctor of Philosophy Thesis, The University of British Columbia, Vancouver, Canada, Aug. 2015, 203 pages.*

(Continued)

*Primary Examiner* — Robert Stevens
(74) *Attorney, Agent, or Firm* — Holland & Hart LLP

(57) ABSTRACT

Methods and systems for backing up and restoring files that have multiple hard links using master file references and index node-based mappings are described. In some cases, file fetching and restoration may be performed by a storage appliance using master file references in which a master file is identified for each multi-link file that is backed-up on the storage appliance and then referenced by one or more hard links to the multi-link file. In other cases, file fetching and restoration may be performed by a storage appliance using index node-based mappings for multi-link files that provide mappings between index node identifiers (e.g., inode numbers) for the multi-link files on a primary system and hard link paths for storing the file contents of the multi-link files on a storage appliance used for backing up the primary system.

20 Claims, 17 Drawing Sheets

(56) References Cited

U.S. PATENT DOCUMENTS

| | | | |
|---|---|---|---|
| 8,903,764 B2* | 12/2014 | Patil | G06F 11/1453 |
| | | | 707/692 |
| 8,954,383 B1* | 2/2015 | Vempati | G06F 16/128 |
| | | | 707/610 |
| 9,229,942 B1 | 1/2016 | MacNeill | |
| 9,229,951 B1* | 1/2016 | Xing | G06F 16/162 |
| 9,430,330 B1 | 8/2016 | Bardhan | |
| 9,984,089 B2* | 5/2018 | Liu | G06F 3/0604 |
| 10,049,019 B2* | 8/2018 | Iwasaki | G06F 16/162 |
| 10,445,191 B1* | 10/2019 | Baruch | G06F 11/1448 |
| 10,534,759 B1 | 1/2020 | Manjunath et al. | |
| 10,809,998 B2* | 10/2020 | Gopalapura Venkatesh | |
| | | | G06F 21/78 |
| 11,288,128 B2* | 3/2022 | Gupta | G06F 16/1837 |
| 2003/0004978 A1* | 1/2003 | Greenbaum | G06F 16/10 |
| 2013/0218847 A1 | 8/2013 | Saika | |
| 2014/0108475 A1 | 4/2014 | Yamada et al. | |
| 2016/0042046 A1* | 2/2016 | Whitehead | G06F 16/273 |
| | | | 707/640 |
| 2017/0177452 A1 | 6/2017 | Parab et al. | |
| 2017/0277715 A1* | 9/2017 | Strauss | G06F 16/1865 |
| 2019/0087282 A1 | 3/2019 | Kumar et al. | |
| 2019/0095285 A1* | 3/2019 | McCormack | G06F 11/1451 |
| 2019/0129810 A1* | 5/2019 | Kushwah | G06F 11/1453 |
| 2019/0340168 A1* | 11/2019 | Raman | H04L 67/1008 |
| 2020/0250049 A1 | 8/2020 | Lee et al. | |
| 2020/0250141 A1 | 8/2020 | Liu et al. | |

OTHER PUBLICATIONS

Beebe, Nicole Lang, et al., "Digital forensic implications of ZFS", Digital Investigation, vol. 6, Supplement, Sep. 2009, pp. S99-S107.*

* cited by examiner

```
Virtual Machine A, Version V7 {
    pBase,          ⟶  /snapshots/VM_A/s5/s5.full
    pF1,            ⟶  /snapshots/VM_A/s6/s6.delta
    pF2             ⟶  /snapshots/VM_A/s7/s7.delta
}
```

```
Virtual Machine A, Version V2 {
    pBase,          ⟶  /snapshots/VM_A/s5/s5.full
    pR1,            ⟶  /snapshots/VM_A/s4/s4.delta
    pR2,            ⟶  /snapshots/VM_A/s3/s3.delta
    pR3             ⟶  /snapshots/VM_A/s2/s2.delta
}
```

```
Virtual Machine A, Version V7 {
    pBase2,              ⟶  /snapshots/VM_A/s7/s7.full
}
```

```
Virtual Machine A, Version V2 {
    pBase2,              ⟶  /snapshots/VM_A/s7/s7.full
    pR11,                ⟶  /snapshots/VM_A/s6/s6.delta
    pR12,                ⟶  /snapshots/VM_A/s5/s5.delta
    pR1,                 ⟶  /snapshots/VM_A/s4/s4.delta
    pR2,                 ⟶  /snapshots/VM_A/s3/s3.delta
    pR3                  ⟶  /snapshots/VM_A/s2/s2.delta
}
```

| File Path | Device ID | Inode Number | Master File |
|---|---|---|---|
| /foo/xy/A.txt | 23 | 678 | |
| /foo/ab/B.txt | 23 | 425 | |
| /zoo/ab/C.txt | 23 | 123 | |
| /zoo/xy/D.txt | 23 | 678 | |
| /my/bar/xy/E.txt | 23 | 678 | |
| /zoo/bar/xy/F.txt | 23 | 425 | |

| File Path | Device ID | Inode Number | Master File | |
|---|---|---|---|---|
| /foo/xy/A.txt | 23 | 678 | - | 415 |
| /foo/ab/B.txt | 23 | 425 | - | 416 |
| /zoo/ab/C.txt | 23 | 123 | - | 417 |
| /zoo/xy/D.txt | 23 | 678 | /foo/xy/A.txt | 412 |
| /my/bar/xy/E.txt | 23 | 678 | /foo/xy/A.txt | 413 |
| /zoo/bar/xy/F.txt | 23 | 425 | /foo/ab/B.txt | 414 |

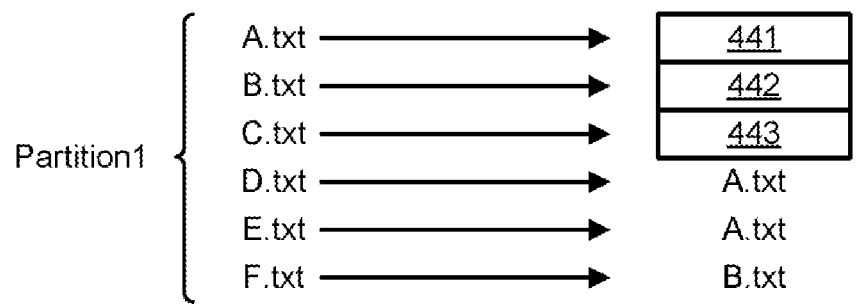
FIG. 4D
| File Path | Device ID | Inode Number | Master File |
|---|---|---|---|
| /foo/xy/A.txt | 23 | 678 | - |
| /foo/ab/B.txt | 23 | 425 | - |
| /zoo/ab/C.txt | 23 | 123 | - |
| /zoo/xy/D.txt | 23 | 678 | /foo/xy/A.txt |
| /my/bar/xy/E.txt | 23 | 678 | /foo/xy/A.txt |
| /zoo/bar/xy/F.txt | 23 | 425 | - |
FIG. 4E
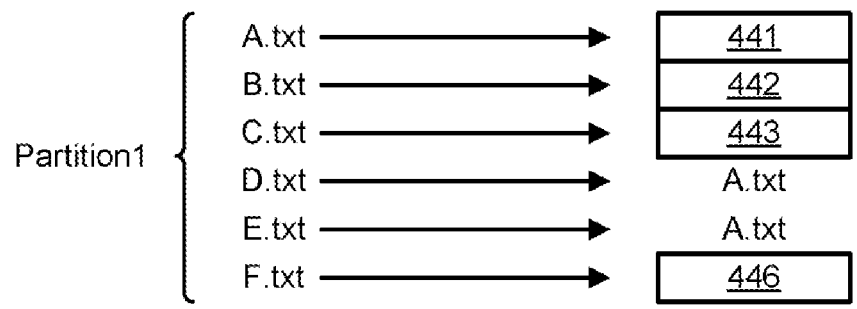
FIG. 4F

| File Path | Device ID | Inode Number | Master File |
|---|---|---|---|
| /foo/ab/B.txt | 23 | 425 | - |
| /zoo/ab/C.txt | 23 | 123 | - |
| /zoo/xy/D.txt | 23 | 678 | - |
| /my/bar/xy/E.txt | 23 | 678 | /zoo/xy/D.txt |
| /zoo/bar/xy/F.txt | 23 | 425 | /foo/ab/B.txt |
| /zoo/bar/xy/G.txt | 23 | 678 | /zoo/xy/D.txt |
FIG. 4G
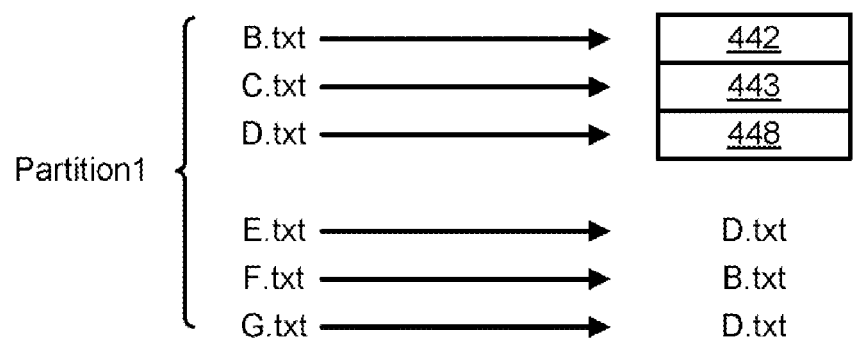
FIG. 4H
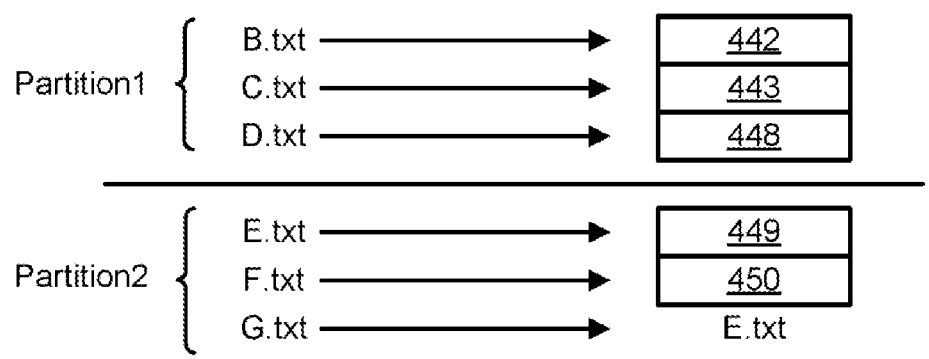
FIG. 4I

| File Path | Device ID | Inode ID | Hash Location | |
|---|---|---|---|---|
| /foo/xy/A.txt | 1 | 678 | /ab/cz/xy.data | 612 |
| /foo/ab/B.txt | 1 | 425 | /ab/abb.data | 616 |
| /foo/ab/C.txt | 1 | 425 | /ab/abb.data | |
| /zoo/xy/D.txt | 1 | 678 | /ab/cz/xy.data | 613 |
| /my/bar/xy/E.txt | 1 | 678 | /ab/cz/xy.data | 614 |
| /zoo/bar/xy/F.txt | 2 | 678 | /ef/jk/ba.data | 615 |
| /zoo/bar/xy/G.txt | 2 | 425 | /ef/jk/jfg.data | |
FIG. 6A
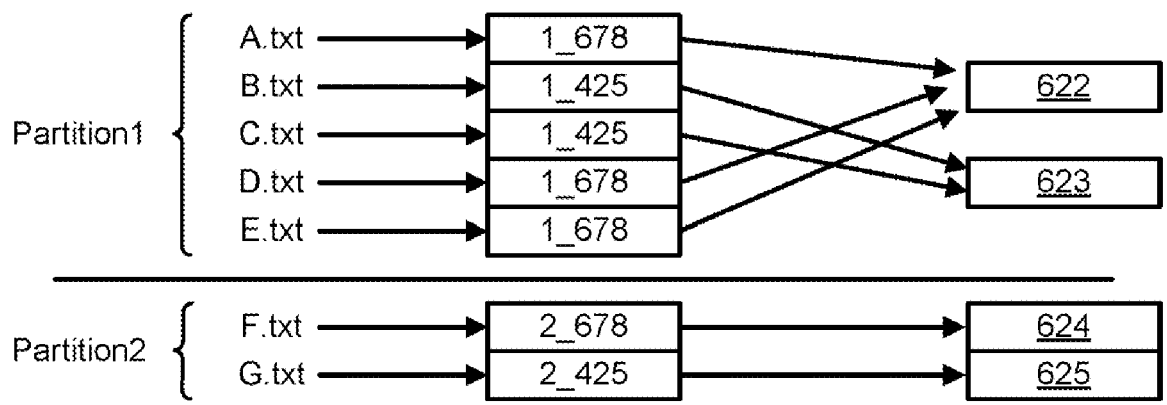
FIG. 6B
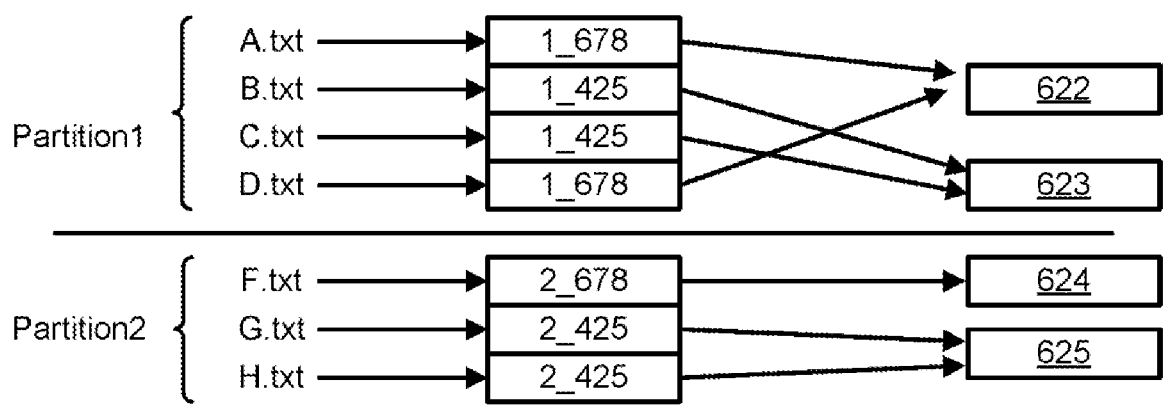
FIG. 6C

| File Path | Device ID | Inode ID | Hash location |
|---|---|---|---|
| /foo/xy/A.txt | 1 | 678 | /ab/cz/xy1.data ~632 |
| | | | /ab/cz/xy2.data ~633 |
| | | | /ab/cz/xy3.data ~634 |
| /foo/ab/B.txt | 1 | 425 | /ab/abb.data |
| /foo/ab/C.txt | 1 | 425 | /ab/abb.data |
| /zoo/xy/M.txt | 2 | 678 | /ef/cz/xy.data |
| /my/bar/xy/N.txt | 2 | 678 | /ef/cz/xy.data |
FIG. 6D
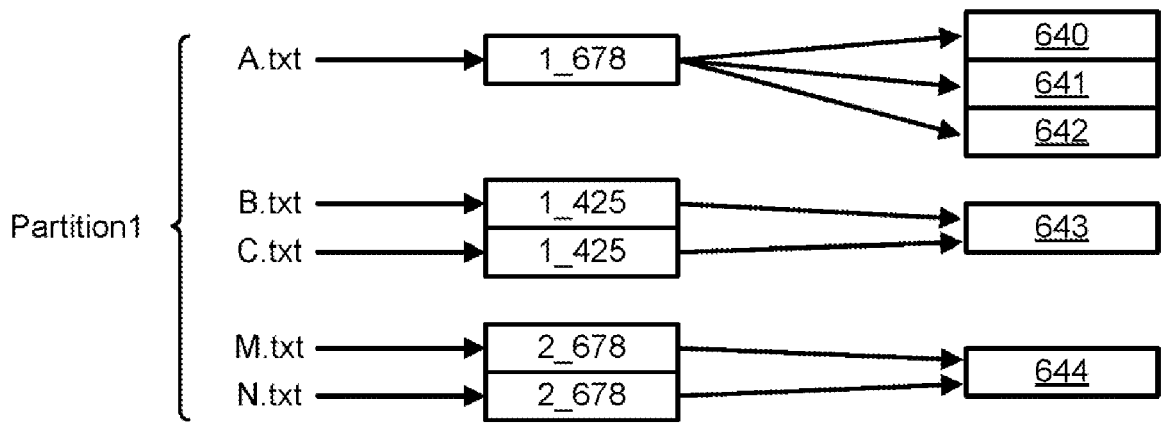
FIG. 6E
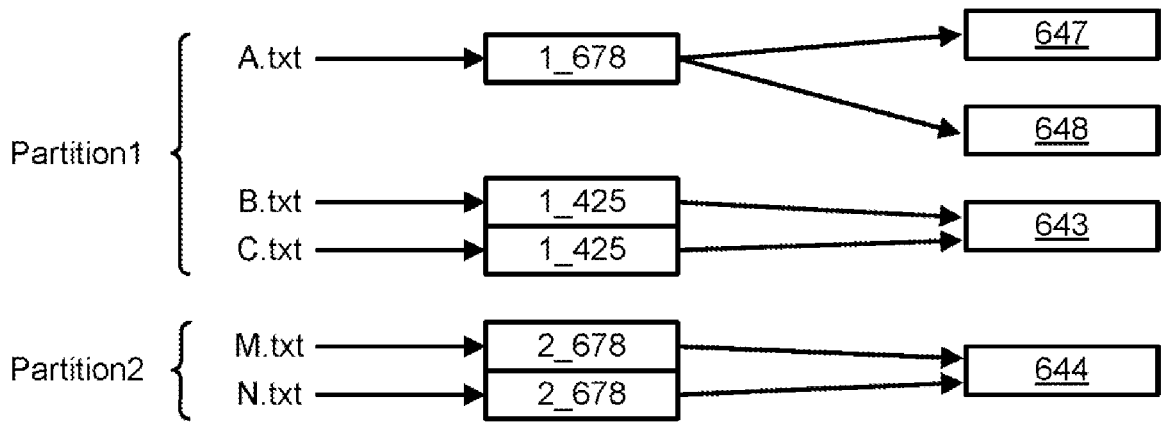
FIG. 6F

| File Path | Device ID | Inode ID | Hash location | Master |
|---|---|---|---|---|
| /foo/xy/A.txt | 1 | 678 | /1/678/a1.data /1/678/a2.data /1/678/a3.data | 1 ~692 |
| /foo/ab/B.txt | 1 | 425 | /1/425/b.data | 0 |
| /foo/ab/T.txt | 1 | 678 | /1/678/a1.data /1/678/a2.data /1/678/a3.data | 0 ~693 |
FIG. 6G
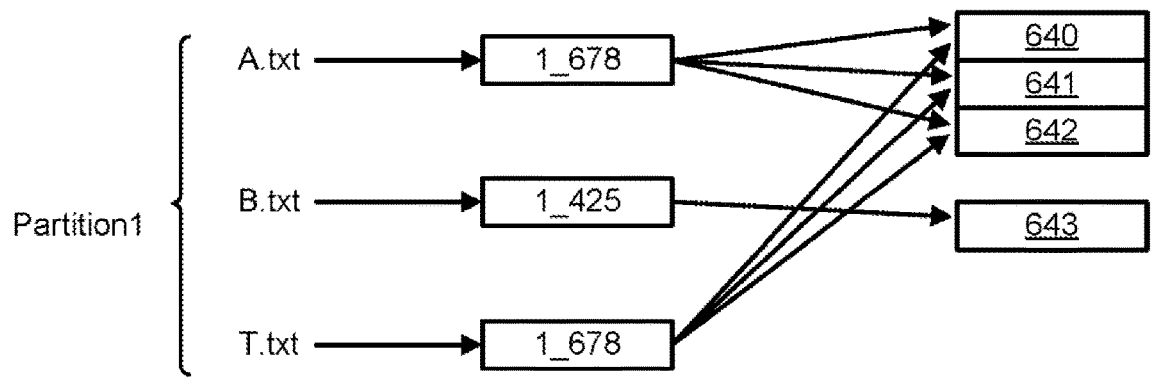
FIG. 6H
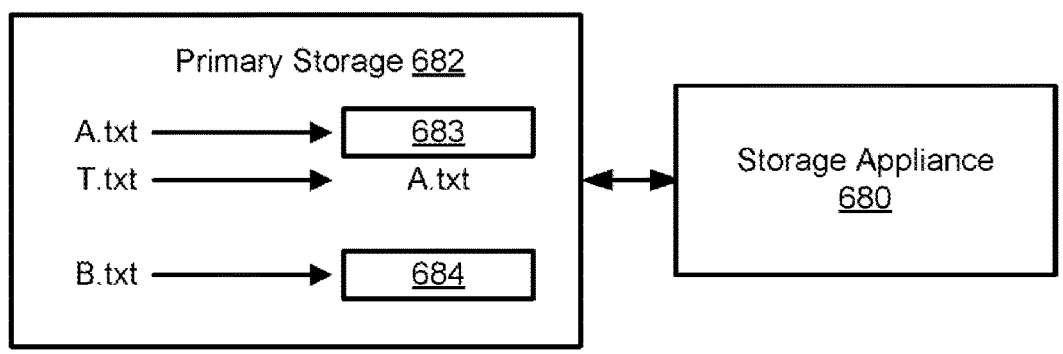
FIG. 6I

BACKUP AND RESTORE OF FILES WITH MULTIPLE HARD LINKS

CROSS REFERENCE TO RELATED APPLICATIONS

This application is a continuation of U.S. patent application Ser. No. 16/264,523 by Lee et al., entitled "Backup and Restore of Files with Multiple Hard Links" and filed Jan. 31, 2019, which is assigned to the assignee hereof and incorporated herein by reference in its entirety.

BACKGROUND

In some file systems (e.g., a journaling file system such as ext4), a file may be stored using both data blocks comprising the data contents of the file and an index node (or inode). The index node may correspond with an entry in an index node table or other data structure that includes metadata about the file, such as file permissions (e.g., read and write permissions), file type (e.g., is the file an executable file), a file size, time stamps associated with when the file was first created and last updated, a location of the file on a disk (e.g., the disk block locations), a number of hard links to the file, and an index number (e.g., a unique inode number for the index node within the file system). Each index node may be linked into a file system via one or more hard links. Each hard link may comprise a filename and an inode number for referencing an index node that corresponds with the contents of a file. The file may have one or more hard links pointing to the index node for the file and therefore hard links may allow more than one filename to be used to reference the same index node for the file. A file may be referred to as a multi-link file if the file references an index node that has two or more hard links pointing to the index node. For example, if a first file with filename A.txt references an index node and a second file with filename B.txt references the same index node, then both the first file and the second file comprise multi-link files. Each time a hard link is created to a file and therefore references the index node for the file, a hard link counter that is part of the index node structure for the index node may be incremented (e.g., a hard link counter such as st_nlink that records the number of hard links to the index node may be incremented). The file contents corresponding with the index node for the file may be accessed as long as the hard link counter is greater than zero.

BRIEF DESCRIPTION OF THE DRAWINGS

FIG. 4D depicts one embodiment of the stored file contents corresponding with the file metadata table depicted in FIG. 4C.

FIG. 4E depicts one embodiment of the file metadata table depicted in FIG. 4B in which non-master files have been identified and references to the file paths corresponding with master files have been entered in the master file field.

FIG. 4F depicts one embodiment of stored file contents corresponding with the file metadata table depicted in FIG. 4E.

FIG. 4G depicts one embodiment of an updated file metadata table in which non-master files have been identified and references to the file paths corresponding with master files have been entered in the master file field.

FIG. 4H depicts one embodiment of stored file contents corresponding with the file metadata table depicted in FIG. 4G.

FIG. 4I depicts one embodiment of stored file contents corresponding with the file metadata table depicted in FIG. 4G after a second partition (Partition2) has been created on the storage appliance.

FIG. 6A depicts one embodiment of a hard links mapping table for storing a set of files on a storage appliance.

FIG. 6B depicts one embodiment of stored file contents corresponding with the hard links mapping table depicted in FIG. 6A.

FIG. 6C depicts one embodiment of the stored file contents depicted in FIG. 6B after file E.txt has been deleted and file H.txt has been added.

FIG. 6D depicts one embodiment of a hard links mapping table for storing a set of files on a storage appliance.

FIG. 6E depicts one embodiment of stored file contents corresponding with the hard links mapping table depicted in FIG. 6D.

FIG. 6F depicts another embodiment of stored file contents corresponding with the hard links mapping table depicted in FIG. 6D.

FIG. 6G depicts another embodiment of a hard links mapping table for storing a set of files on a storage appliance.

FIG. 6H depicts one embodiment of stored file contents corresponding with the hard links mapping table depicted in FIG. 6G.

FIG. 6I depicts one embodiment of a primary storage device for storing a set of electronic files in communication with a storage appliance for backing up the set of electronic files.

DETAILED DESCRIPTION

Figure 1A:
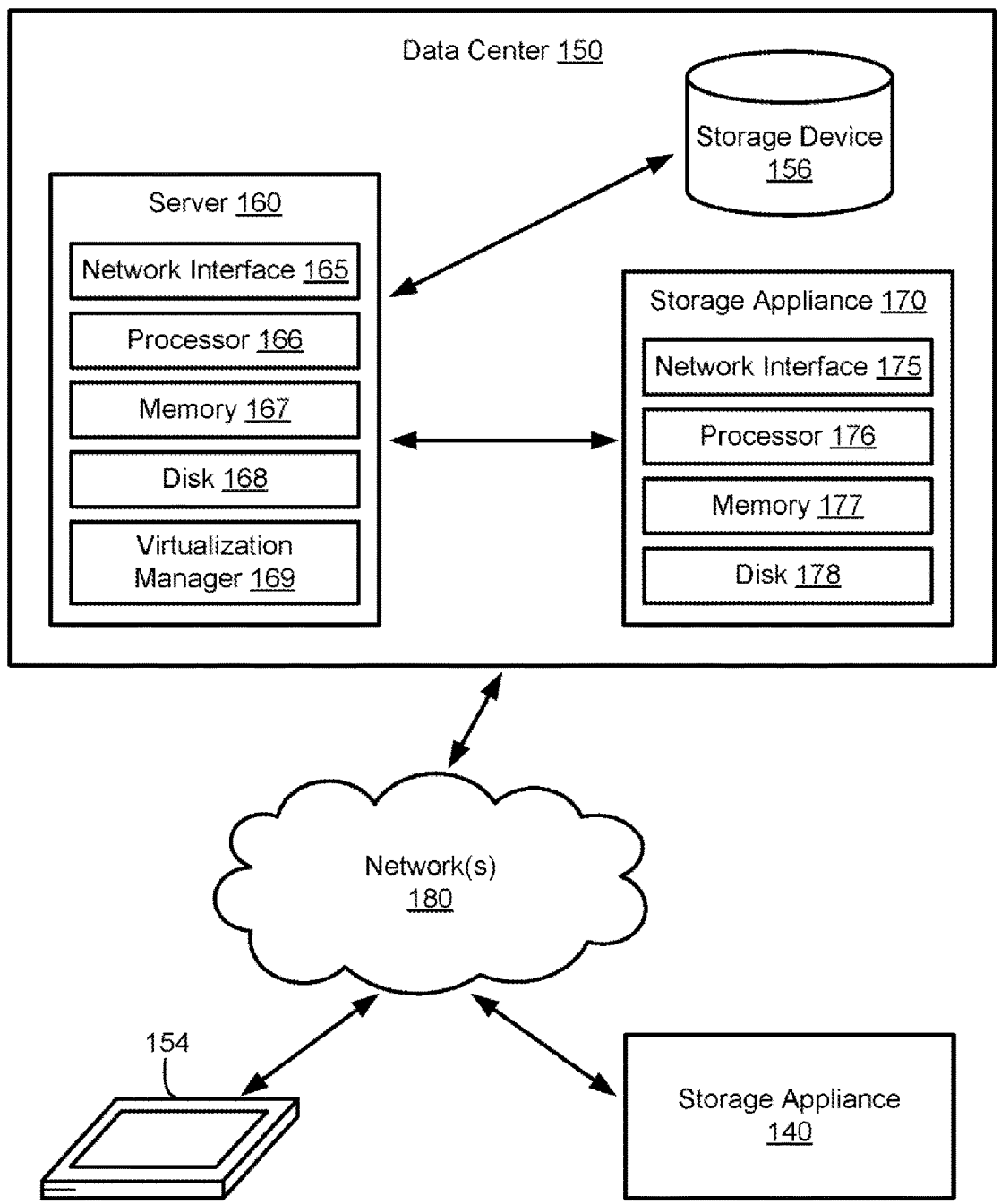
FIG. 1A depicts one embodiment of a networked computing environment.

Technology is described for backing up and restoring files that have multiple hard links using master file references and index node-based mappings. In some cases, file fetching and restoration may be performed by a storage appliance using master file references in which a master file is identified for each multi-link file that is backed-up and then referenced by one or more hard links that point to the index node for the multi-link file. In the process of backing up a snapshot of an entire file system or a set of files within the file system, the storage appliance may crawl a filesystem tree for the file system to extract metadata for the set of files to be backed-up, generate an enriched file metadata table that includes an identification of non-master files and their mappings to master files within the set of files using the metadata, and then acquire only a subset of the set of files less than all of the files within the set of files based on the mappings of the non-master files to their corresponding master files. The set of files may include a multi-link file and one or more files that have hard links pointing to the multi-link file (i.e., that are referencing the index node for the multi-link file). A master file for the one or more files that have hard links to the multi-link file may be identified such that all other files that have hard links to the multi-link file comprise non-master files that reference or point to the master file. In one embodiment, the master file may be selected based on a lexicographical ordering of one or more fields associated with the one or more files that have hard links to the multi-link file. The one or more fields may include control fields corresponding with file paths, file names, device identifiers, and/or inode numbers for the one or more files. In one example, the one or more files that have hard links to the multi-link file may be sorted lexicographically by filename or file path and the master file may be selected as the first occurrence alphanumerically or the last occurrence alphanumerically. In another embodiment, the master file may be selected as the file of the one or more files that have hard links to the multi-link file with the greatest number of file restores within a prior time period, such as the last 24 hours.

During a data fetch operation, only one copy of the multi-link file may be fetched and stored as the master file and each of the non-master files may correspond with a link to the master file; the enriched file metadata table may store the mappings of the non-master files to the master file. In this case, only the master file may be copied or transferred to the storage appliance with the non-master files being skipped in order to avoid duplication of the data transferred to the storage appliance. Furthermore, the original hard link relationships within the original file hierarchy being backed-up may be preserved by the storage appliance. For example, the hard link relationships for two or more files that have hard links pointing to the same multi-link file within the original file hierarchy may be reconstructed during restoration of the two or more files.

During a data restore operation, regular files and master files are restored first prior to reconstruction of links to the master files for the non-master files. The data restore operation may comprise a partial restore operation in which a subset of the set of files that have been backed-up are restored. The subset of the set of files may include an orphaned non-master file that references a master file that is not in the subset of files to be restored; in this case, either the contents of the non-master file must be restored (e.g., the non-master file may be restored as a regular file that does not link to another file) or a new master file for the non-master file that is in the subset of files to be restored must be nominated and a link from the non-master file to the new master file must be created for the non-master file. In one example, if the non-master file is to be restored as part of a directory restore, then the non-master file should only link to another file within the directory (e.g., linked to a new master file that has already been restored) or be restored as a regular file that does not link to another file. As a hard link may require that the hard link destination exists prior to creation of the hard link, a hard link to a new master file may be created after the new master file has already been created on the destination and an inode number for the new master file is known.

In some embodiments, a storage appliance, such as storage appliance 170 in FIG. 1A, may acquire and store a plurality of files that are linked to the same multi-link file (e.g., that were linked to the multi-link file using hard links to the index node for the multi-link file) from a hardware server by nominating a master file out of the plurality of files to be acquired, identifying the other files of the plurality of files as non-master files, acquiring and storing the file contents of the master file, and then storing pointers from the non-master files to the master file. In one example, a table (e.g., a portion of an enriched file metadata table) for the plurality of files may include a master file field or column that maps each of the non-master files to the file path for the master file. Each of the plurality of files may be identified using the device identifier associated with the device storing the file (e.g., a device number such as st_dev), the file path for the file stored on the hardware server, and/or the index node number assigned to the original multi-link file on the hardware server (e.g., an inode number such as st_ino). The master file may be nominated or selected by generating a table or list of the plurality of files that includes the device identifiers, the file paths, and the index numbers assigned to the plurality of files. The table or list may be sorted in lexicographical order or alphanumeric order and the master file may be selected as the first file in the table or list. The master file may also be nominated by identifying the file out of the plurality of files with the earliest creation date or identifying the file out of the plurality of files that has been restored the most within the past 24 hours or the past week.

In some cases, if the sum of the file sizes for the plurality of files that are hard linked to the same multi-link file is less than a threshold file size (e.g., is less than 10 MBs) or less than a percentage of the sum of all file sizes for the files to be backed-up (e.g., is less than 0.2% of the combined file sizes for all the files to be backed-up), then the plurality of files may be treated as regular files without a master file being selected for the plurality of files and the file contents for each of the plurality of files may be acquired and stored by the storage appliance. In other cases, if a master file is less than a threshold file size (e.g., is less than 2 MBs) or less than a percentage of the sum of all file sizes for files being backed-up (e.g., is less than 0.05% of the combined file sizes for all the files to be backed-up), then the master file and the non-master files that link to the master file may all be treated as regular files without links.

A storage appliance may back-up files from a primary storage device (e.g., a source disk) over time. In some cases, master files and the non-master files that link to them may be stored using a partition on the storage appliance that is different from the partition used for storing regular files (or files that do not comprise multi-link files) on the storage appliance. For example, all master files and non-master files that link to master files may be stored on a first partition and regular files may be stored on a second partition different from the first partition. Locating a master file and all the non-master files that link to the master file on the same partition within the storage appliance may reduce the number of partitions that need to be mounted in order to restore the non-master files.

In some embodiments, file fetching and restoration may be performed by a storage appliance using index node-based mappings for multi-link files that provide many-to-one mappings between index node identifiers (e.g., inode numbers) for the multi-link files on a primary storage device (e.g., a hardware server) and hard link paths for storing the file contents of the multi-link files on a backup storage device (e.g., a storage appliance). A string or hash key corresponding with a concatenation of an inode number for a multi-link file (e.g., st_ino) and a device identifier of a device storing the multi-link file (e.g., st_dev) may be generated and used by an inode mapping function (e.g., a hash function) on the backup storage device to identify a file path to the multi-link file on the backup storage device. In some cases, the backup storage device may scan metadata for a set of files residing on the primary storage device to be backed-up, identify multi-link files within the set of files (e.g., by detecting that the st_nlink field or another field representing the number of hard links to the file is greater than one), and acquired index node information for each file of the identified multi-link files, such as the inode number for the file (e.g., st_ino) and the device identifier of a device containing the file (e.g., st_dev). The multi-link files may be assigned to one of a plurality of hard link designated partitions for storing multi-link files. Each hard link partition may be associated with a hard links metadata file that includes for each multi-link file stored within the partition the multi-link file's inode number from the primary storage device, the multi-link file's device identifier from the primary storage device, a partition identifier for the backup storage device, and a file path to the file contents on the backup storage device. The file path to the file contents on the backup storage device may be determined using the inode mapping function with either the inode number or a combination of the inode number and the device identifier as input keys.

One technical issue with nominating a master file for the multiple files associated with a multi-link file is that if the master file is ever deleted or moved, then a new master file may need to be nominated and data corresponding with the new master file may need to be acquired and stored by a storage appliance in order to back-up the multiple files. For example, if the master file is deleted, then the new master file may be acquired or fetched from a hardware server and the references for the non-master files may be updated to point to the path of the new master file. However, with a masterless approach that utilizes index node-based mappings for multi-link files, the refetching of the data associated with the new master file does not need to be performed when the master file is deleted or moved. One benefit of backing up and restoring files with multiple hard links using index node-based mappings is that the refetching of file data due to the deletion of a master file may be avoided.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
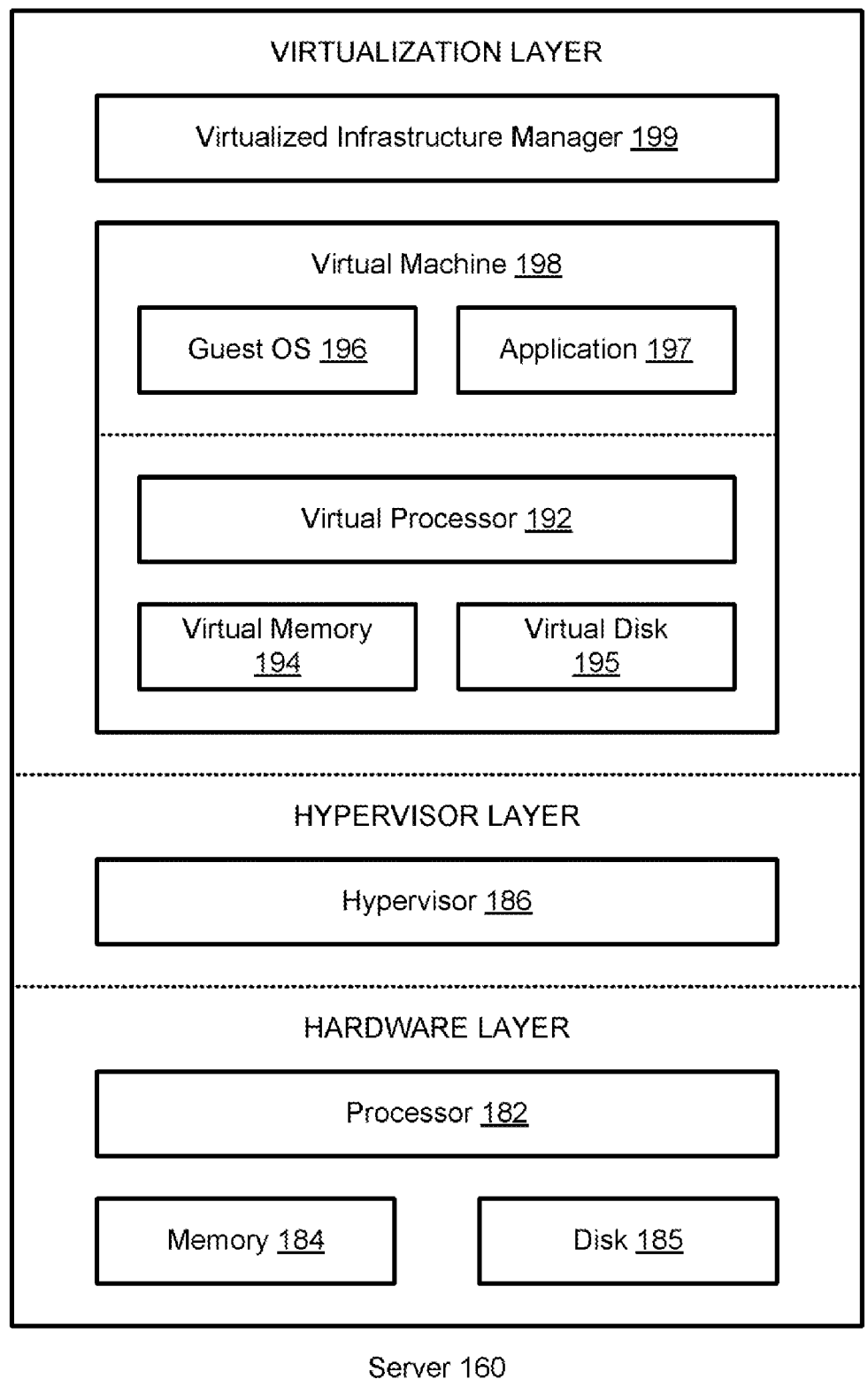
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
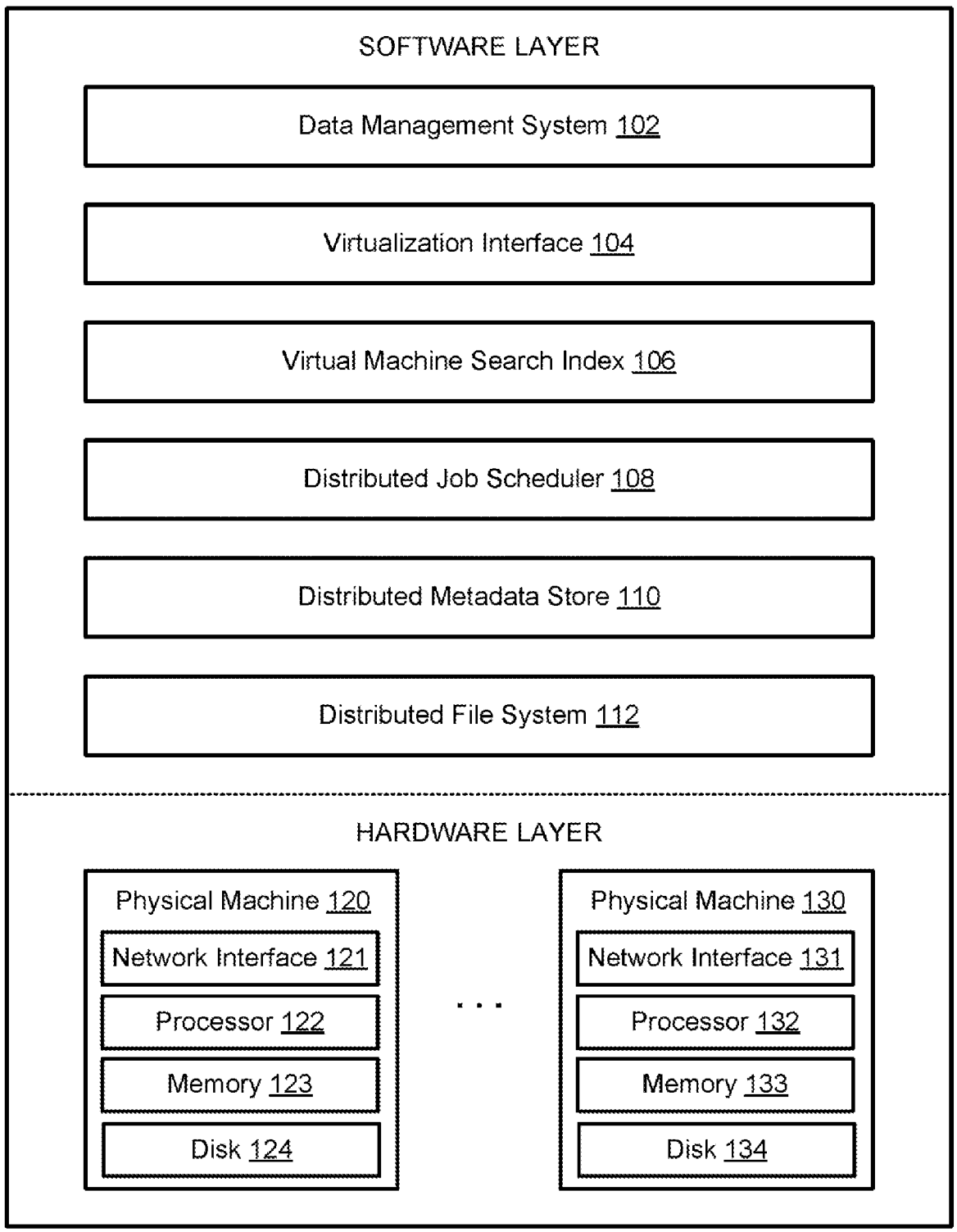
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VMA/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks within the cluster may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a solid-state storage device, such as a solid-state drive (SSD) or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. The concepts described herein may also be applicable to managing versions of a real machine or versions of electronic files. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualized infrastructure, such as the virtualized infrastructure manager 199 in FIG. 1B, and for requesting data associated with virtual machine snapshots from the virtualized infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
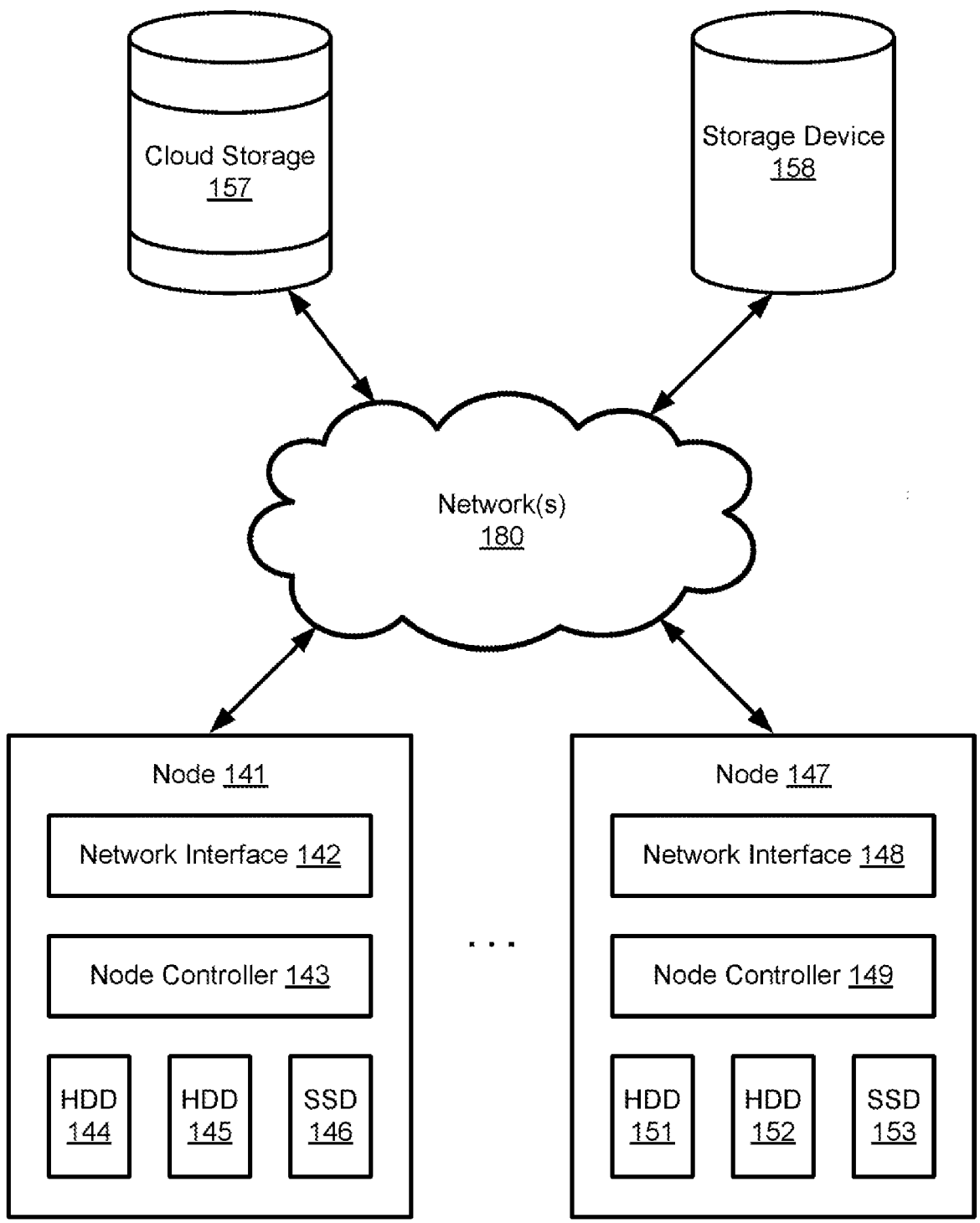
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

FIGS. 2A-2F depict various embodiments of sets of files and data structures (e.g., implemented using merged files) associated with managing and storing snapshots of virtual machines. Although various embodiments may be described in reference to the management of virtual machine snapshots, the concepts may be applied to the management of other data snapshots as well, such as snapshots of databases, filesets (e.g., Network Attached Storage filesets), and sets of electronic files.

Figures 2A, 2B, 2C:
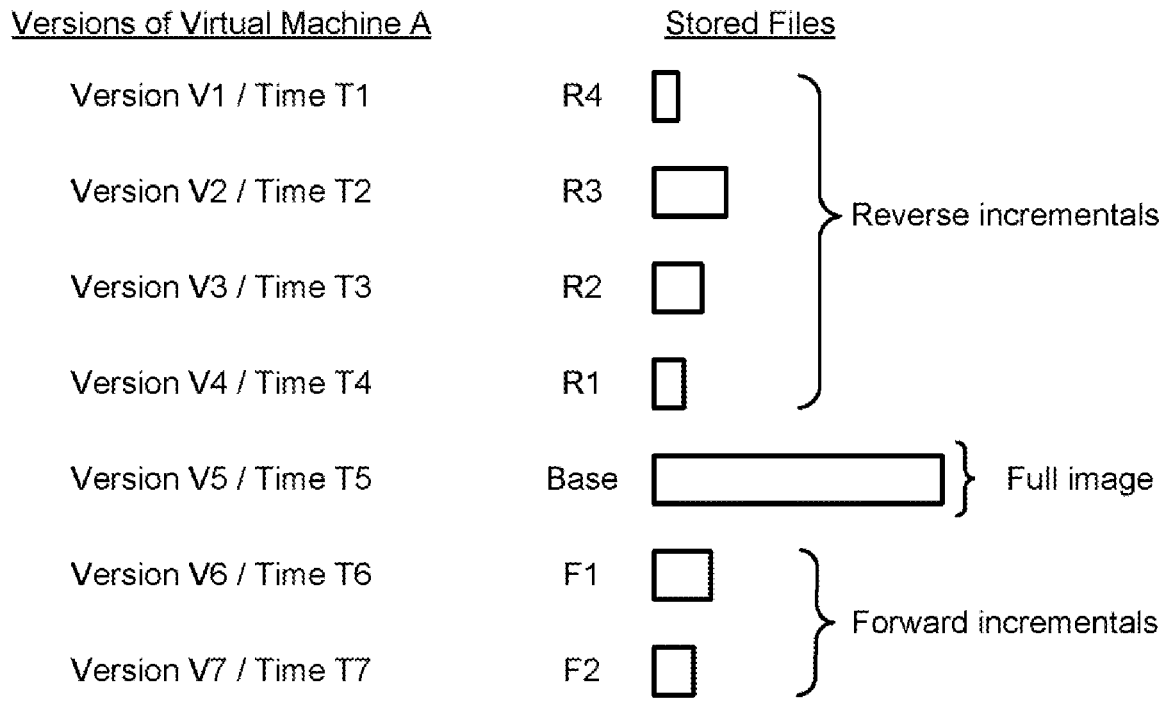
FIGS. 2A-2F depict various embodiments of sets of files and data structures associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6 and may comprise one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path/snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path/snapshots/VM_A/s4/s4.delta), a third pointer (pR2) that references the reverse incremental R2 (e.g., via the path/snapshots/VM_A/s3/s3.delta), and a fourth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

Figures 2D, 2E, 2F:
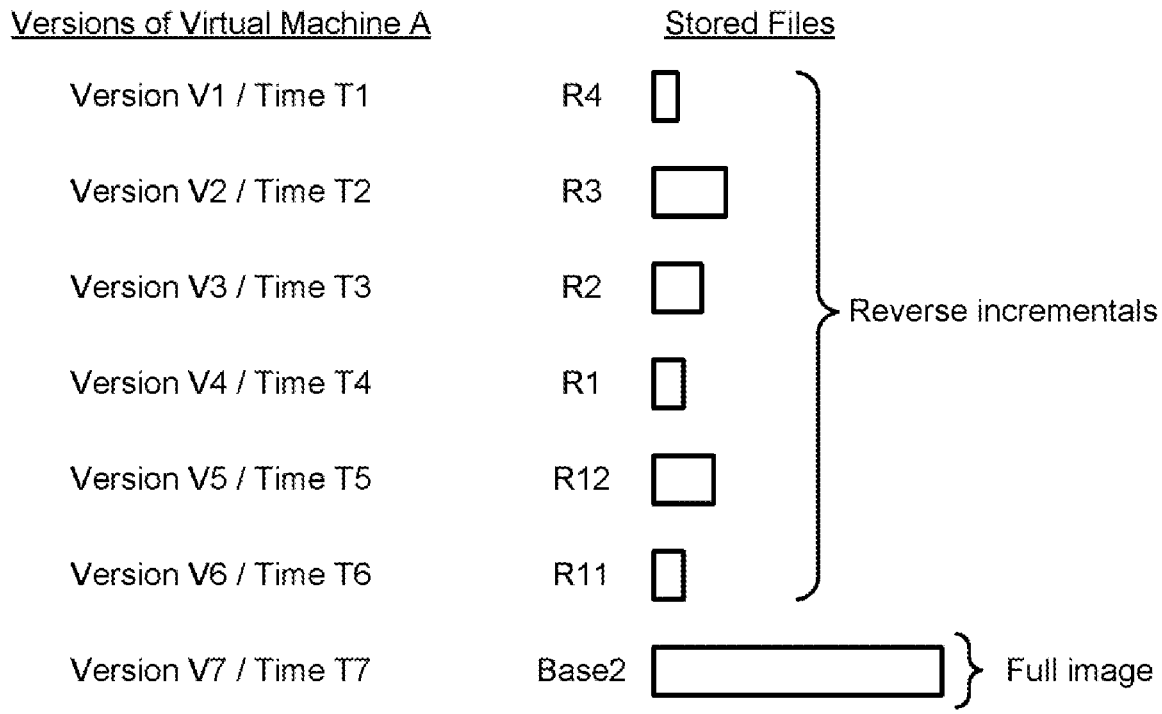

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path/snapshots/VM_A/s6/s6.delta), a third pointer (pR12) that references the reverse incremental R12 (e.g., via the path/snapshots/VM_A/s5/s5.delta), a fourth pointer (pR1) that references the reverse incremental R1 (e.g., via the path/snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figure 3A:
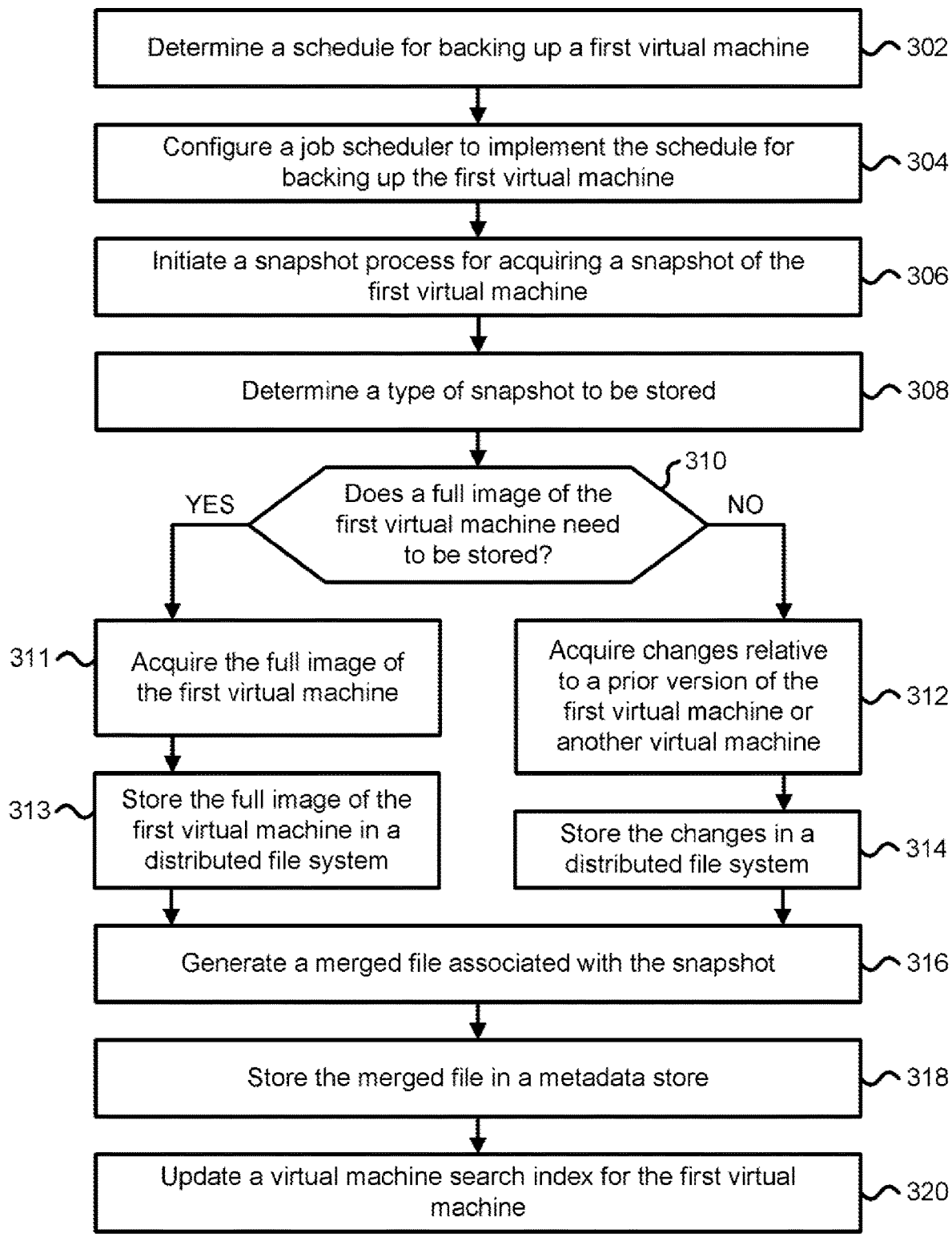
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operating system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
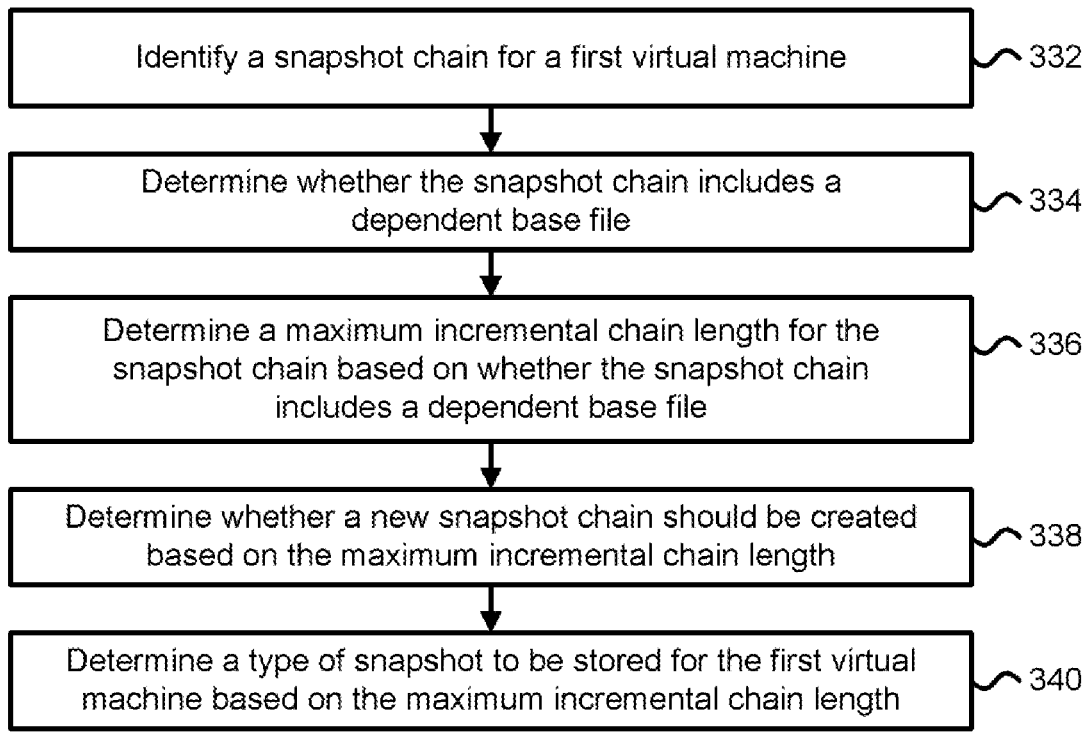
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

Figure 3C:
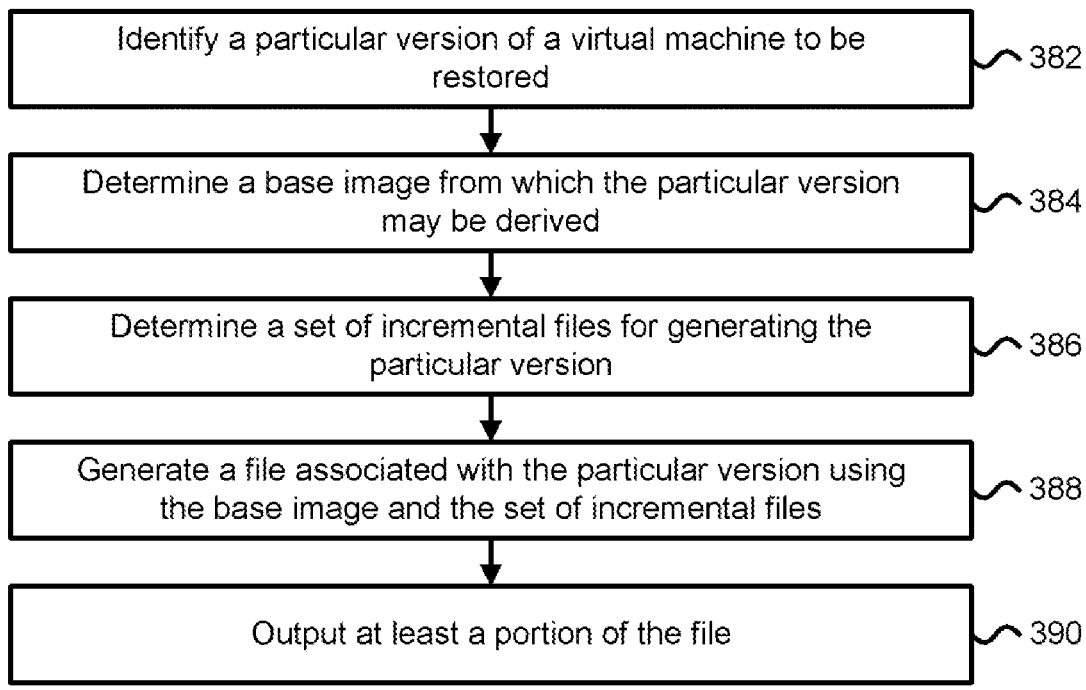
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and/or one or more reverse incremental files. In step 388, a file associated with the particular version is generated using the base image and the set of incremental files. The file may be generated by patching the set of incremental files onto the base image. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine.

Figures 4A, 4B, 4C:
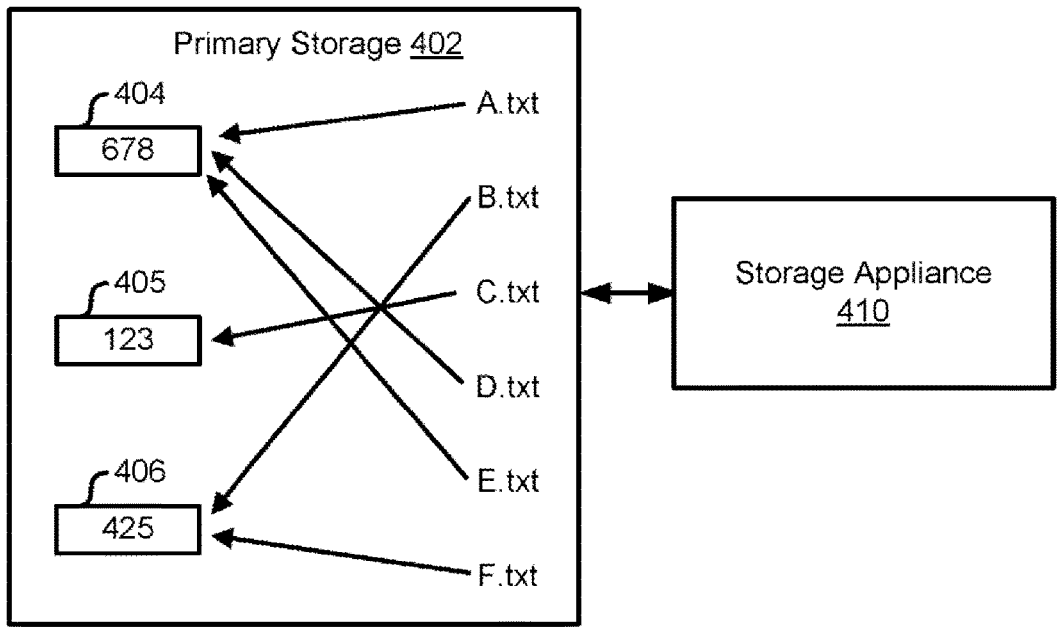
FIG. 4A depicts one embodiment of a primary storage device for storing a set of electronic files in communication with a storage appliance for backing up the set of electronic files.
FIG. 4B depicts one embodiment of a file metadata table that stores metadata for the set of electronic files backed-up using the storage appliance in FIG. 4A.
FIG. 4C depicts one embodiment of the file metadata table depicted in FIG. 4B in which non-master files have been identified and references to the file paths corresponding with master files have been entered in the master file field.

FIG. 4A depicts one embodiment of a primary storage device for storing a set of electronic files in communication with a storage appliance for backing up the set of electronic files. The primary storage device 402 may correspond with a hardware server, such as server 160 in FIG. 1A, and the storage appliance 410 may correspond with storage appliance 170 in FIG. 1A. In one example, the primary storage device 402 may comprise a file server, a Network Attached Storage (NAS) server, or a file-level data storage server. The set of electronic files includes files with the filenames A.txt, B.txt, C.txt, D.txt, E.txt, and F.txt. The files with filenames A.txt, D.txt, and E.txt all map to the same index node 404 with the inode number "678." The files with filenames A.txt, D.txt, and E.txt may each have a hard link to the index node 404. The files with filenames B.txt and F.txt map to the index node 406 with the inode number "425" and the file with filename C.txt maps to the index node 405 with the inode number "123." The files with filenames B.txt and F.txt may each have a hard link to the index node 425.

As the number of files that point to the index node 404 is greater than one, the index node 404 corresponds with a multi-link file. In this case, the files with filenames A.txt, D.txt, and E.txt comprise multi-link files and may all point to the same underlying electronic file contents via hard links. Similarly, as the number of files that point to the index node 406 is greater than one, the index node 406 also corresponds with a multi-link file. In this case, the files with filenames B.txt and F.txt comprise multi-link files and may all point to the same underlying electronic file contents via hard links. As the number of files that point to the index node 405 is not greater than one, the index node 405 does not correspond with a multi-link file with only file C.txt pointing to the index node 405. Although the storage of text files (.txt files) is depicted in FIGS. 4A-4I, the concepts described herein may be applied to other types of electronic files, such as image files, virtual disk files, and/or executable files.

FIG. 4B depicts one embodiment of a file metadata table that stores metadata for the set of electronic files backed-up using the storage appliance 410 in FIG. 4A. The file metadata table includes a file path field (File Path) associated with the file path of a file stored on the primary storage device 402 in FIG. 4A, a device identifier field (Device ID) associated with a device that contains a directory entry for the file on the primary storage device 402 in FIG. 4A, an inode number field (Inode Number) associated with the file, and a master file field (Master File) associated with a reference to a master file. A file may be uniquely identified using the device identifier and the inode number for the file.

As depicted in FIG. 4B, the file path for the file with filename A.txt is "/foo/xy/A.txt," the device identifier is "23," and the inode number is "678." The file path for the file with filename D.txt is "/zoo/xy/D.txt," the device identifier is "23," and the inode number is "678." In this case, because the device identifiers and the inode numbers for the files A.txt and D.txt are the same, they comprise multi-link files. In one example, A.txt may be identified as a master file for D.txt and D.txt may be identified as a non-master file that points to the master file A.txt. In some cases, the file metadata table may only include mappings or entries for multi-link files stored on the storage appliance; files not included in the file metadata table but stored on the storage appliance may comprise regular files or non-linked files.

FIG. 4C depicts one embodiment of the file metadata table depicted in FIG. 4B in which non-master files have been identified and references to the file paths corresponding with master files have been entered in the master file field. As the entries 415-417 in the master file field associated with files A.txt, B.txt, and C.txt are empty, those files will be treated as master files. The master file field entry 412 for file D.txt includes a pointer to "foo/xy/A.txt," that may comprise the file path for the file A.txt that has been backed-up and stored on a storage appliance. The master file field 413 for file E.txt also includes a pointer to "foo/xy/A.txt." Thus, both files D.txt and E.txt have been stored on the storage appliance as non-master files that point to master file A.txt. Only the file contents for file A.txt may be stored on the storage appliance and the master file field entries 412-413 may be used to access the file contents for the master file A.txt. The determination that files A.txt, D.txt, and E.txt comprise multi-link files that all point to the same underlying file may be made by detecting that the entries for both the device identifier and the inode number are identical. The master file field entry 414 for file F.txt includes a pointer to "foo/ab/B.txt." Thus, file F.txt comprises a non-master file that points to master file B.txt.

In regards to restoring the file F.txt during a file restore operation (or to transfer the file F.txt from the storage appliance to the primary storage device), if the file B.txt is not also being restored as part of the restored set of files, then the storage appliance may restore F.txt as a regular file using the file contents of the file B.txt stored on the storage appliance at "/foo/ab/B.txt." However, if the file B.txt is also one of the restored set of files, then the storage appliance may restore B.txt and then restore F.txt using a hard link to the restored file B.txt.

In some embodiments, rather than storing a file path within a master file field of the file metadata table, such as master field entry 412 in FIG. 4C, a hash function may be stored on the storage appliance and accessed by the storage appliance to provide the mapping from an input hash key to a particular file path on the storage appliance. The input hash key may comprise a concatenation of a device identifier and an inode number. For example, the hash function may map an input hash key of "678_23" comprising a string with an inode number and a device identifier to a file path on the storage appliance comprising "foo/xy/A.txt." In this case, the resulting file path need not be stored using the file metadata table. In some cases, the file metadata table may include a hash function pointer field that points to the particular hash function to be used for mapping the input hash key to the file path on the storage appliance. With a masterless approach, the storage appliance may calculate the hash location inline when data is fetched or acquired from a primary storage device.

FIG. 4D depicts one embodiment of stored file contents corresponding with the file metadata table depicted in FIG. 4C. As depicted, file contents for files A.txt, B.txt, and C.txt have been stored on a storage appliance using data blocks 441-443. The file contents for files D.txt, E.txt, and F.txt are not stored on the storage appliance and instead the file metadata table provides pointers to the corresponding master files. For example, non-master files D.txt and E.txt point to master file A.txt and non-master file F.txt points to master file B.txt.

FIG. 4E depicts one embodiment of the file metadata table depicted in FIG. 4B in which non-master files have been identified and references to the file paths corresponding with master files have been entered in the master file field. As depicted, the master file field entries associated with files A.txt, B.txt, C.txt, and F.txt are empty. The master file field entries for files D.txt and E.txt point to the file path for the master file A.txt. In this case, although both files B.txt and F.txt have the same device identifier and inode number, a master/non-master file relationship has not been created. A master/non-master file relationship may be created for a non-master file if the file metadata table includes an entry in the master file field for the file.

In one embodiment, B.txt and F.txt may be stored and restored as regular files that do not link to any other files if the sum of the file sizes is less than a threshold file size (e.g., the combined file size of B.txt and F.txt is less than 2 GB). In another embodiment, B.txt and F.txt may be stored and restored as regular files if a file size of one of the files is less than a threshold file size (e.g., B.txt is less than 1 GB) and/or the number of files that link to the same device identifier and inode number is less than a threshold number of files (e.g., not more than two files map to the same device identifier and inode number). In some embodiments, the creation of a master/non-master file relationship may only be made if the sum of the files sizes of the multi-link files with the same device identifier and inode number is greater than an upper threshold file size (e.g., is greater than 10 GB) or if the number of files that have the same device identifier and inode number is greater than a threshold number of files (e.g., there are two or more files that have the same device identifier and inode number). In some embodiments, the generation of master/non-master file relationships and the corresponding entries in the file metadata table may be performed in response to detecting that the amount of available storage space on a storage appliance is less than a threshold amount of storage space (e.g., is less than 200 GBs).

FIG. 4F depicts one embodiment of stored file contents corresponding with the file metadata table depicted in FIG. 4E. As depicted, file contents for files A.txt, B.txt, C.txt and F.txt have been stored on a storage appliance using data blocks 441-443 and 446. The data blocks 441-443 and 446 may be stored as four files on the storage appliance. The file contents for files D.txt and E.txt are not stored on the storage appliance and instead the file metadata table provides pointers to the corresponding master files. For example, non-master files D.txt and E.txt point to master file A.txt via the master file entries referencing the file path "/foo/xy/A.txt" for the file A.txt on the storage appliance.

FIG. 4G depicts one embodiment of an updated file metadata table in which non-master files have been identified and references to the file paths corresponding with master files have been entered in the master file field. In one embodiment, the file metadata table depicted in FIG. 4C may correspond with a first point in time snapshot of a set of files and the updated file metadata table depicted in FIG. 4G may correspond with a second point in time snapshot of the set of files subsequent to the first point in time. As depicted, the file A.txt that was backed up with the file metadata table in FIG. 4C no longer exists and a new file G.txt has been added to the updated file metadata table. The file G.txt has the same device identifier "23" and inode number "678" as file D.txt. Due to the deletion of A.txt that acted as a master file for E.txt in the file metadata table of FIG. 4C, a new master file has been nominated or selected with D.txt selected as the new master file for files E.txt and G.txt. The master file entry for file E.txt in the file metadata table has been changed from "/foo/xy/A.txt" in FIG. 4C to "/zoo/xy/D.txt" in FIG. 4G. The new master file may be identified as the first file in the table with the same device identifier and inode number. The table may be sorted by inode number (e.g., sorting alphanumerically) and the new master file may be selected as the first file to appear in the table with the same inode number. In some cases, the new master file may be identified as the oldest remaining file with the same device identifier and inode number (e.g., based on a time stamp of the creation date).

FIG. 4H depicts one embodiment of stored file contents corresponding with the file metadata table depicted in FIG. 4G. As depicted, file contents for files B.txt, C.txt, and D.txt and have been stored in a first partition (Partition1) on the storage appliance using data blocks 442-443 and 448. The file contents for files E.txt, F.txt, and G.txt are not stored on the storage appliance and instead the file metadata table provides pointers to the corresponding master files. For example, non-master files E.txt and G.txt point to master file D.txt and non-master file F.txt points to master file B.txt.

FIG. 4I depicts one embodiment of stored file contents corresponding with the file metadata table depicted in FIG. 4G after a second partition (Partition2) has been created on the storage appliance. In some cases, the storage appliance may create a new partition in order to store backed-up files if it is detected that a partition on the storage appliance for storing files has exceeded a threshold disk size (e.g., exceeds 1 TBs of disk space). As depicted in FIG. 4I, files E.txt, F.txt, and G.txt have been moved to the second partition with E.txt acting as the master file for non-master file G.txt. In some embodiments, a storage appliance may create a new partition, such as the second partition, based on a history of prior file restorations. For example, multi-link files that have been restored more than twice within the past 24 hours may be moved to a new partition. The new partition may correspond with a data partition on the same disk as the first partition. The new partition may exist on a first storage device of a first type (e.g., an SSD) and the first partition may exist on a second storage device of a second type (e.g., a HDD). The first storage device of the first type may have a higher read speed and/or a higher write speed than the second storage device of the second type. Thus, more frequently accessed multi-link files may be moved to a faster partition or a faster data storage device.

Figure 5A:
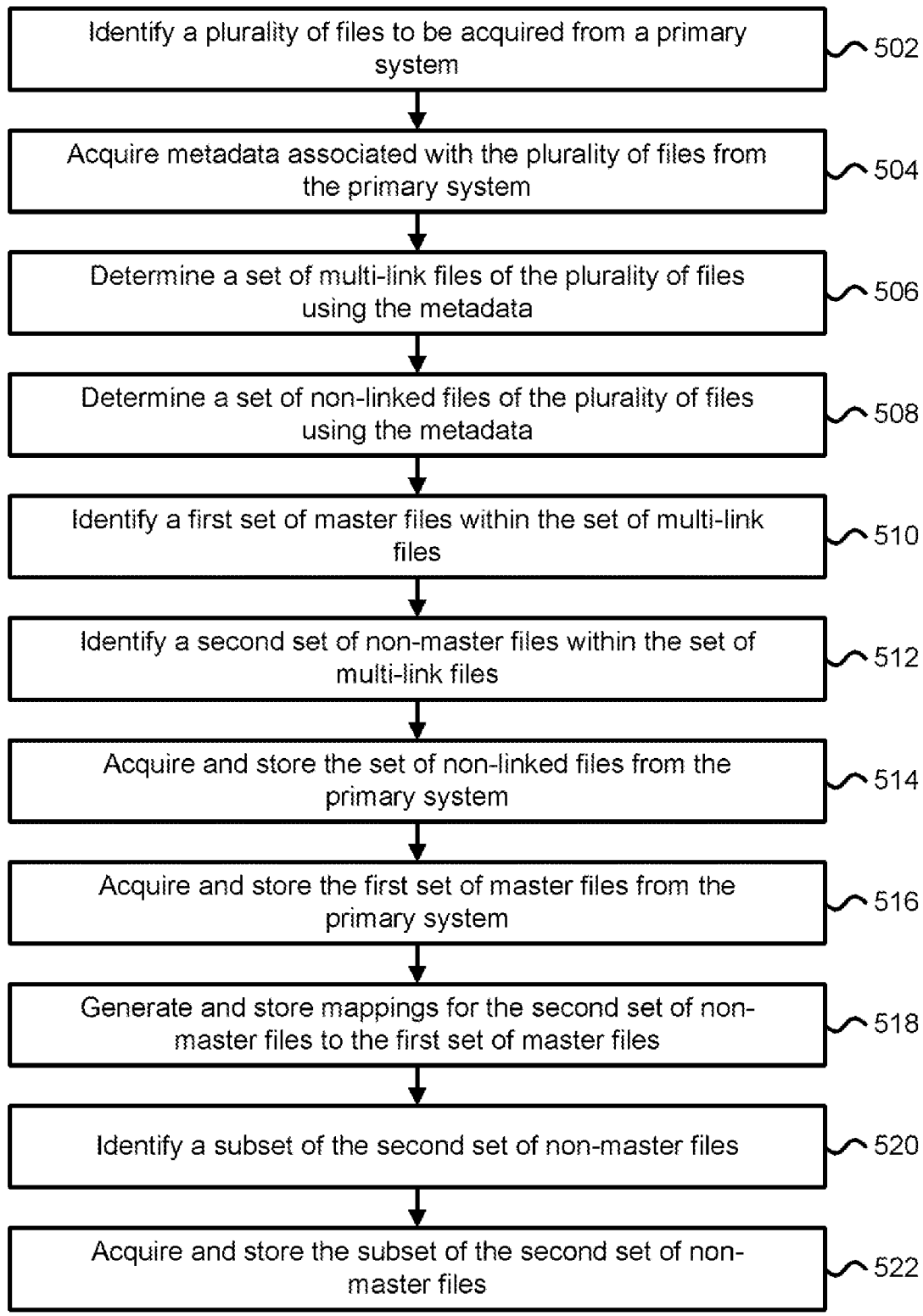
FIG. 5A is a flowchart describing one embodiment of a process for backing up a set of files.

FIG. 5A is a flowchart describing one embodiment of a process for backing up a set of files. In one embodiment, the process of FIG. 5A may be performed by a storage appliance, such as storage appliance 170 or storage appliance 140 in FIG. 1A. The process of FIG. 5A may be performed by a data storage node, such as data storage node 141 in FIG. 1D.

In step 502, a plurality of files to be acquired from a primary system is identified. The primary system may comprise a hardware server, a file server, or a primary data storage system that stores the plurality of files. In step 504, metadata associated with the plurality of files is acquired from the primary system. The metadata may comprise file metadata for each file of the plurality of files including timestamps associated with when the file was created and last modified, a number of links for the file (e.g., the number of hard links), an index number or an inode number associated with the file, and a device identifier associated with the device storing the file. In step 506, a set of multi-link files of the plurality of files is determined using the metadata. In one example, a multi-link file may be identified based on the number of hard links for the file (e.g., if st_ino is greater than one). In step 508, a set of non-linked files of the plurality of files is determined using the metadata. The set of non-linked files may comprise regular files.

In step 510, a first set of master files within the set of multi-link files is identified. In one example, a master file within the first set of master files may be identified as the file with the earliest creation date (or the latest creation date) out of files that have the same device identifier and inode number. In some cases, the file with the latest creation date may be more likely to be deleted than the file with the earliest creation date. In step 512, a second set of non-master files within the set of multi-link files is identified. Once the master file has been identified, all other files with the same device identifier and inode number may be identified as non-master files and may be linked to or reference the master file. In step 514, the set of non-linked files is acquired and stored from the primary system. In this case, regular files that do not comprise multi-link files may be acquired prior to acquisition of the set of multi-link files. In one embodiment, the non-linked files may be stored within a first partition on a storage appliance and the set of multi-link files may be stored on a second partition on the storage appliance. One benefit of storing the set of multi-link files on the second partition different from the first partition is that it may reduce the number of partitions that need to be mounted in order to restore the plurality of files that have been backed-up using the storage appliance.

In step 516, the first set of master files is acquired and stored from the primary system. In step 518, mappings for the second set of non-master files to the first set of master files are generated and stored. The mappings for the second set of non-master files to the first set of master files may be stored using a file metadata table, such as the file metadata table in FIG. 4C. The mappings may correspond with a master file entry within the file metadata table and may include a file path for a master file on the storage appliance.

In step 520, a subset of the second set of non-master files is identified. The subset of the second set of non-master files may be identified based on one or more file sizes for the subset of non-master files. In step 522, the subset of the second set of non-master files is acquired and/or stored. In some embodiments, if the sum of the file sizes for a grouping of files out of the plurality of files with the same device identifier and inode number is less than a threshold file size or is less than a percentage of the combined file sizes of the plurality of files stored on a storage appliance, then the grouping of files with the same device identifier and inode number may be treated as regular files without a master file being selected. The subset of the second set of non-master files may be stored by the storage appliance without requiring the subset of the second set of non-master files to be fetched or transferred to the storage appliance as identical copies of the files were acquired in step 516 with the acquisition of the first set of master files. The subset of the second set of non-master files may be stored by copying file contents from master files of the first set of master files to file path locations on the storage appliance corresponding with the subset of the second set of non-master files and updating the file metadata table to remove the mappings for the subset of the second set of non-master files to the master files of the first set of master files.

Figure 5B:
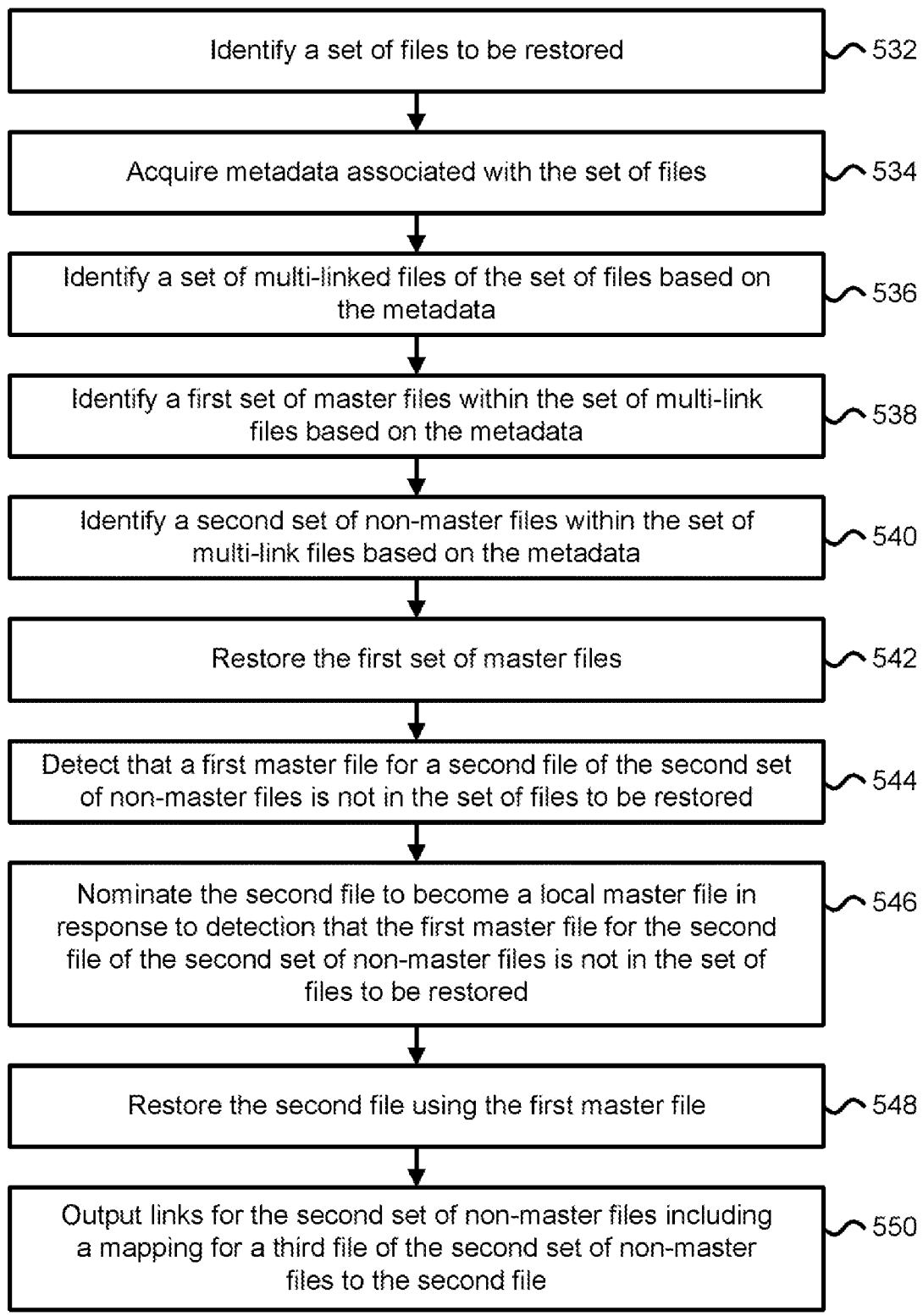
FIG. 5B is a flowchart describing one embodiment of a process for restoring a set of files.

FIG. 5B is a flowchart describing one embodiment of a process for restoring a set of files. In one embodiment, the process of FIG. 5B may be performed by a storage appliance, such as storage appliance 170 or storage appliance 140 in FIG. 1A. The process of FIG. 5B may be performed by a data storage node, such as data storage node 141 in FIG. 1D.

In step 532, a set of files to be restored is identified. The set of files may reside on a storage appliance for backing up the set of files. The storage appliance may correspond with storage appliance 170 in FIG. 1A. In step 534, metadata associated with the set of files is acquired. The metadata may comprise file metadata for each file of the set of files including an index number or an inode number associated with the file, a device identifier associated with the file, a file path corresponding with a location of the file on a primary storage system, and/or a pointer to a master file reference for the file if the file comprises a non-master file. The pointer to the master file reference may comprise an identification of a file path to a master file on the storage appliance.

In step 536, a set of multi-link files of the set of files is identified using the metadata. Each of the files in the set of multi-link files comprises a multi-link file. A multi-link file in the set of multi-link files may be identified if more than one file within a file metadata table has the same device identifier and inode number. In some embodiments, metadata for only multi-link files of the set of files may be stored in the file metadata table. In step 538, a first set of master files within the set of multi-link files is identified based on the metadata. In step 540, a second set of non-master files within the set of multi-link files is identified based on the metadata. The first set of master files and the second set of non-master files may be identified based on master file entries within the file metadata table. In one example, if the master file entry for a file does not include a reference to another file, then the file may be deemed to comprise a master file. Referring to FIG. 4C, master file entry 412 that references another file means that file D.txt comprises a non-master file and does not comprise a master file; however, master file entry 415 that does not reference another file means that file A.txt comprises a master file.

In step 542, the first set of master files is restored. The first set of master files may be transferred from a storage appliance to a hardware server acting as a primary storage device. In step 544, it is detected that a first master file for a second file of the second set of non-master files is not in the set of files to be restored. In this case, the second file cannot be restored as a hard link to the first master file because the first master file is not in the set of files to be restored. The second file may be restored as a regular file or as a non-master file that references a newly nominated master file that is in the set of files to be restored. In step 546, the second file is nominated to become a local master file in response to detection that the first master file for the second file of the second set of non-master files is not in the set of files to be restored. In one example, the second file may comprise the file out of a group of files within the set of files to be restored with the same device identifier and inode number that has the most recent creation date or the earliest creation date.

In step 548, the second file is restored using the first master file. The second file may be restored by accessing the file contents of the first master file on the storage appliance and transferring the second file with the file contents. In step 550, links for the second set of non-master files including a link for a third file of the second set of non-master files to the second file are outputted. In one example, a hard link for the third file to the second file may be created and stored on the primary storage system after the second file has been stored on the primary storage system. In another example, the storage appliance may transmit instructions for the second set of non-master files to the primary storage system including transmitting an instruction to link the third file of the second set of non-master files to the second file. In this case, the second file may comprise a substitute master file for the third file.

FIG. 6A depicts one embodiment of a hard links mapping table for storing a set of files on a storage appliance. The table includes a file path field (File Path) associated with the file path of a file stored on a primary storage device (e.g., the primary storage device 402 in FIG. 4A), a device identifier field (Device ID) associated with a device that contains a directory entry for the file on the primary storage device, an inode number field (Inode ID) associated with the file, and a file path mapping field (Hash Location) associated with file paths to file contents on the storage appliance. In some cases, a file path mapping entry for a file may include one or more file paths to locations on the storage appliance that store file content for the file.

As depicted, the file A.txt has a device identifier of "1," an inode number of "678," and a file path mapping entry 612 to "/ab/cz/xy.data." The file contents for the file A.txt may be acquired from the location "/ab/cz/xy.data" on the storage appliance and restored on a primary storage system as "/foo/xy/A.txt." The files A.txt, D.txt, and E.txt all have the same device identifier and inode number; they also have the same file path mapping entries 612-614 that map the device identifier "1" and inode number "678" to one or more locations on the storage appliance. In this case, if in the future A.txt is deleted from the storage appliance, then files D.txt and E.txt will still have pointers to the file contents located at "/ab/cz/xy.data" on the storage appliance. Thus, the index node-based mappings provided in the hard links mapping table of FIG. 6A do not require the refetching of file content in the event that file A.txt is deleted. It should be noted that although file F.txt has the same inode number as file A.txt, the two files did not have the same file path mapping entries as the file mapping entry 615 for F.txt maps to "/ef/jk/ba.data" and the file mapping entry 612 for A.txt maps to "/ab/cz/xy.data." In one embodiment, the backed-up files A.txt, B.txt, C.txt, D.txt, and E.txt may be stored on a first partition on the storage appliance and the files F.txt and G.txt may be stored on a second partition different from the first partition.

FIG. 6B depicts one embodiment of stored file contents corresponding with the hard links mapping table depicted in FIG. 6A. As depicted, file contents for files A.txt, B.txt, C.txt, D.txt, and E.txt have been stored on a first partition (Partition1) of a storage appliance using data blocks 622-623. The file contents for files F.txt and G.txt have been stored on a second partition (Partition2) of the storage appliance using data blocks 624-625. As the files A.txt, D.txt, and E.txt share the same device identifier "1" and inode number "678," a hash key including a concatenation of the device identifier "1" and inode number "678" will map to the same data block 622. The file path for data block 622 may comprise the file path mapping entry 612 in FIG. 6A to "/ab/cz/xy.data." The hash key for file A.txt may comprise "1_678." Similarly, as the files B.txt and C.txt share the same device identifier "1" and inode number "425," a hash key including a concatenation of the device identifier "1" and inode number "425" will map to the same data block 623. The file path for data block 623 may comprise a file path mapping entry 616 in FIG. 6A to "/ab/abb.data." A hash function or a lookup table may be used to map an input hash key to one or more file paths.

FIG. 6C depicts one embodiment of the stored file contents depicted in FIG. 6B after file E.txt has been deleted and file H.txt has been added. The deletion of E.txt and H.txt may have occurred between snapshots of a set of files stored on a primary storage system. The files G.txt and H.txt with the same device identifier "2" and inode number "425" are mapped to the same hash key "2425" that maps to data block 625 on the second partition (Partition2) on the storage appliance. The file path for data block 625 depicted in FIG. 6A is "/ef/jk/jfg.data."

FIG. 6D depicts one embodiment of a hard links mapping table for storing a set of files on a storage appliance. The table includes a file path field (File Path) associated with the file path of a file stored on a primary storage device (e.g., the primary storage device 402 in FIG. 4A), a device identifier field (Device ID) associated with a device that contains a directory entry for the file on the primary storage device, an inode number field (Inode ID) associated with the file, and a file path mapping field (Hash Location) associated with file paths to file contents on the storage appliance. As depicted, the file path mapping entry for the file A.txt with device identifier "1" and inode number "678" includes three file path entries 632-634. In this case, the file contents of A.txt may have been partitioned into three data chunks that have been stored as three separate files corresponding with the three file path entries 632-634.

In one embodiment, the determination of whether to partition the file contents of A.txt into two or more data chunks may depend on a file size of the file. In one example, if the file size of A.txt is greater than a threshold file size (e.g., is greater than 200 GBs), then the file contents may be partitioned into two or more data chunks such that each of the data chunks is less than 200 GBs. In another example, if the file size of A.txt is less than the threshold file size, then the file contents may be stored using a single file.

FIG. 6E depicts one embodiment of stored file contents corresponding with the hard links mapping table depicted in FIG. 6D. As depicted, file contents for file A.txt have been stored on a first partition (Partition1) of a storage appliance using data blocks 640-642. The hash key "1_678" that includes a combination of the device identifier "1" and the inode number "678" maps to three entries for the three data blocks 640-642. In one embodiment, the number of partitions corresponding with the number of file path mapping entries for a file in the hard links mapping table may depend upon a file size for the file, the number of files that have the same device identifier and inode number, the number of hard links to the file, and/or the amount of available disk space remaining on the storage appliance. In one example, if the amount of available disk space remaining on the storage appliance is less than a threshold amount of disk space (e.g., falls below 100 GB), then the number of partitions may be increased (e.g., from one partition to three partitions). In another example, if the file size is greater than a threshold file size (e.g., is greater than 10 GB), then the number of partitions may be set such that each partitioned file is not more than the threshold file size (e.g., if the file size is 36 GB and the threshold file size is 10 GB, then four partitioned files of 9 GB each may be stored). In another example, if the number of files that have the same device identifier and inode number is greater than a threshold number (e.g., is greater than three), then the number of partitions may be set to the number of hard links for the file or set such that each partitioned file does not exceed a threshold file size (e.g., each of the partitioned files does not exceed 10 GBs).

FIG. 6F depicts one embodiment of stored file contents corresponding with the hard links mapping table depicted in FIG. 6D. As depicted, file contents for file A.txt have been stored on a first partition (Partition1) of a storage appliance using data blocks 647-648. The hash key "1_678" that includes a combination of the device identifier "1" and the inode number "678" maps to two entries for the two data blocks 647-648. In one embodiment, if the file size for file A.txt in FIG. 6D is reduced or falls below a threshold file size (e.g., falls below 10 GBs) during a subsequent snapshot, then the number of partitions may be reduced from the three partitions corresponding with the data blocks 640-642 in FIG. 6B to the two partitions corresponding with the data blocks 647-648 in FIG. 6F.

FIG. 6G depicts one embodiment of a hard links mapping table for storing a set of files on a storage appliance. The table includes a file path field (File Path) associated with the file path of a file stored on a primary storage device (e.g., the location of a backed-up file on the primary storage device 682 in FIG. 6I), a device identifier field (Device ID) associated with a device that contains a directory entry for the file on the primary storage device, an inode number field (Inode ID) associated with the file, a file path mapping field (Hash Location) associated with file paths to file contents on the storage appliance, and a master identifier field (Master) associated with whether the file was assigned by the primary storage device as a master file to which other files should be linked when the linked files are restored.

As depicted in FIG. 6G, the file path mapping entry for the file A.txt with device identifier "1" and inode number "678" includes three file path entries and the file path mapping entry for the file T.txt with device identifier "1" and inode number "678" includes the same three file path entries to files "a1.data," "a2.data," and "a3.data." The master identifier field 692 for A.txt has been set to "1" (e.g., designating a master file) and the master identifier field 693 for T.txt has been set to "0" (e.g., designating a non-master file). In this case, if both files A.txt and T.txt are restored, then A.txt may be restored as a master file and T.txt may be restored as a non-master file and a link (e.g., a hard link) may be created from the file T.txt to A.txt on the destination.

In some embodiments, if a set of files to be restored does not include a file that has been designated as a master file, then a substitute master file may be nominated to act as a master file. In one example, the substitute master file may be selected as the file out of a group of files within the set of files to be restored with the same device identifier and inode number that has the most recent creation date or the oldest creation date. In another example, the substitute master file may be selected as the file out of a group of files within the set of files to be restored with the same device identifier and inode number that has been restored most frequently within the past 24 hours or within a past time period (e.g., within the past week).

FIG. 6H depicts one embodiment of stored file contents corresponding with the hard links mapping table depicted in FIG. 6G. As depicted, file contents for file A.txt have been stored on a first partition (Partition1) of a storage appliance using data blocks 640-642. The hash key "1_678" generated for file A.txt maps to the three file path mapping entries for the three data blocks 640-642. The hash key "1_678" generated for file T.txt also maps to the three file path mapping entries for the three data blocks 640-642. The hash key "1_425" generated for file B.txt maps to a file path mapping entry for data block 643.

FIG. 6I depicts one embodiment of a primary storage device for storing a set of electronic files in communication with a storage appliance for backing up the set of electronic files. The primary storage device 682 may correspond with a hardware server, such as server 160 in FIG. 1A, and the storage appliance 680 may correspond with storage appliance 170 in FIG. 1A. As depicted, the files A.txt, T.txt, and B.txt have been transferred from the storage appliance in order to restore the files. In response to an instruction to restore a set of files including A.txt, T.txt, and B.txt, the storage appliance 680 may transfer regular files and master files prior to creating links for non-master files. In one example, the storage appliance 680 may transfer files A.txt and B.txt to the primary storage device 682 prior to causing the primary storage device 682 to create a link (e.g., a hard link) for file T.txt to the master file A.txt.

Figure 7:
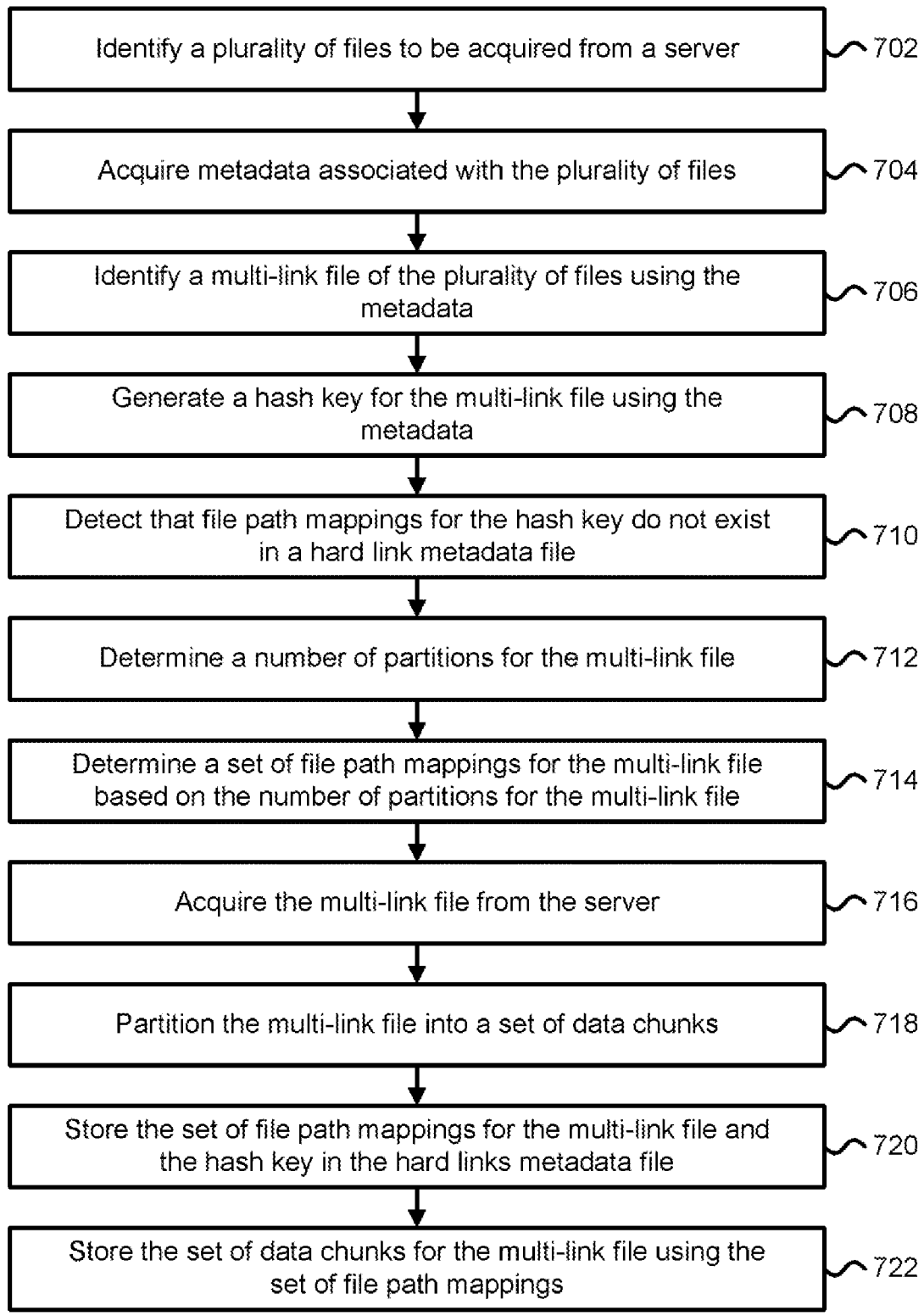
FIG. 7 is a flowchart describing one embodiment of a process for backing up a set of files.

FIG. 7 is a flowchart describing one embodiment of a process for backing up a set of files. In one embodiment, the process of FIG. 7 may be performed by a storage appliance, such as storage appliance 170 or storage appliance 140 in FIG. 1A. The process of FIG. 7 may be performed by a data storage node, such as data storage node 141 in FIG. 1D.

In step 702, a plurality of files to be acquired from a server is identified. The plurality of files may correspond with electronic files stored on a primary storage server, such as server 160 in FIG. 1A or primary storage device 402 in FIG. 4A, that are backed-up over time using a storage appliance, such as storage appliance 410 in FIG. 4A. The plurality of files may correspond with a snapshot of the plurality of files at a particular point in time. In step 704, metadata associated with the plurality of files is acquired. The metadata may comprise file metadata for each file of the plurality of files including timestamps associated with when each file was created and last modified, a number of links for the file (e.g., the number of hard links), an index number or an inode number associated with the file, and a device identifier associated with the device storing the file. In step 706, a multi-link file of the plurality of files is identified using the metadata. The multi-link file may comprise a file with two or more hard links to the file. In step 708, a hash key for the multi-link file is generated using the metadata. In one embodiment, the hash key may include a string that includes a device identifier for the file and an inode number for the file. In one example, the hash key may comprise a concatenation of the device identifier and the inode number.

In step 710, it is detected that the file path mappings for the hash key generated in step 708 do not exist in a hard links metadata file or table. In this case, the multi-link file may comprise the first file to be stored or written to the hard links metadata file with the device identifier and the inode number of the file. In step 712, a number of partitions for the multi-link file is determined. The number of partitions for the multi-link file may be determined based on the file size for the multi-link file. The number of partitions for the multi-link file may be set such that each partitioned file is not more than 10 GBs. In step 714, a set of file path mappings for the multi-link file is determined based on the number of partitions for the multi-link file. In one example, the set of file path mappings may correspond with the file path mapping entries 632-634 depicted in FIG. 6D for file A.txt. In step 716, the multi-link file is acquired from the server. In step 718, the multi-link files is partitioned or split into a set of data chunks. The set of data chunks may correspond with the number of partitions for the multi-link file. For example, if the number of partitions for the multi-link file is three, then the set of data chunks may comprise three data chunks. In step 720, the set of file path mappings for the multi-link file and the hash key are stored in the hard links metadata file. The hard links metadata file may be stored on the storage appliance. In step 722, the set of data chunks for the multi-link file are stored using the set of file path mappings. Each data chunk of the set of data chunks may correspond with one file path mapping of the set of file path mappings. In some cases, the number of partitions and/or the number of data chunks may be adjusted over time as the file size of the multi-link file changes.

One embodiment of the disclosed technology includes identifying a set of files to be restored to a hardware server, acquiring metadata associated with the set of files, identifying a set of multi-link files of the set of files based on the metadata, identifying a first set of master files within the set of multi-link files based on the metadata, identifying a second set of non-master files within the set of multi-link files based on the metadata, detecting that a first master file for a second file of the second set of non-master files is not in the set of files to be restored, nominating the second file to become a second master file in response to detection that the first master file for the second file of the second set of non-master files is not in the set of files to be restored, restoring the first set of master files, restoring the second file using the first master file, and transmitting instructions for the second set of non-master files to the hardware server subsequent to restoring the second file including transmitting an instruction to link a third file of the second set of non-master files to the second file.

One embodiment of the disclosed technology includes identifying a plurality of files located on a server to be backed-up, acquiring metadata associated with the plurality of files from the server, and identifying a multi-link file of the plurality of files using the metadata. The metadata may include a number of links for the multi-link file, an inode number for the multi-link file, and/or a device identifier for the multi-link file. The method further comprises generating a hash key corresponding with the multi-link file using the metadata. The hash key includes the inode number for the multi-link file and the device identifier for the multi-link file. The method further comprises detecting that a file path mapping for the hash key does not exist in a hard links metadata file, determining one or more file path mappings for the multi-link file in response to detecting that a file path mapping for the hash key does not exist in the hard links metadata file, acquiring the multi-link file from the server, partitioning the multi-link file into a set of data chunks, storing the one or more file path mappings for the multi-link file and the hash key in the hard links metadata file, and storing the set of data chunks for the multi-link file using the one or more file path mappings.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
　　nominating a first file of a set of files within a file system to become a first master file, the set of files comprising files to be restored to a hardware server;
　　identifying remaining files in the set of files within the file system, the remaining files comprising a set of non-master files including one or more non-master files that include a pointer to the first master file;
　　storing a respective mapping between each non-master file of the one or more non-master files and the first master file in a file metadata table;
　　detecting a second file of the set of non-master files that includes a pointer to a second master file, the second master file not included in the set of files to be restored;
　　nominating the second file to become a third master file in response to detecting that the second master file for the second file of the set of non-master files is not in the set of files to be restored;
　　storing one or more second mappings between a subset of the set of non-master files and the third master file in the file metadata table based at least in part on nominating the second file to become the third master file; and restoring the set of files to the hardware server based at least in part on the one or more respective mappings and the one or more second mappings stored in the file metadata table.

2. The method of claim 1, wherein restoring the set of files comprises:
    restoring, to the hardware server, the first master file prior to detecting the second file that references to the second master file; and
    restoring, to the hardware server, the one or more non-master files that reference to the first master file based at least in part on a respective link between each of the one or more non-master files and the first master file, wherein the first master file and the one or more non-master files correspond to a same device identifier and a same index node number.

3. The method of claim 1, wherein restoring the set of files comprises:
    restoring the second file based at least in part on file contents of the second master file on a storage appliance, wherein restoring the second file comprises:
        transferring the second file with the file contents from the storage appliance to the hardware server.

4. The method of claim 3, further comprising:
    creating, after restoring the second file, a respective link between each non-master file of the subset of the set of non-master files and the third master file based at least in part on the third master file and each non-master file of the subset of the set of non-master files corresponding to a same device identifier and a same index node number, wherein storing the one or more second mappings comprises storing the respective link for each non-master file of the subset of the set of non-master files in a storage system.

5. The method of claim 3, further comprising:
    transmitting an instruction to link a third file of the subset of the set of non-master files to the third master file based at least in part on the third master file and each non-master file of the subset of the set of non-master files corresponding to a same device identifier and a same index node number.

6. The method of claim 3, wherein restoring the set of files further comprises:
    restoring a third file of the subset of the set of non-master files after restoring the second file and based at least in part on a second mapping between the third file and the third master file, wherein the one or more second mappings comprise the second mapping.

7. The method of claim 1, wherein nominating the first file to become the first master file comprises:
    nominating the first file to become the first master file based at least in part on the first file corresponding to a most recent creation date of a set of creation dates associated with the set of files.

8. The method of claim 1, wherein nominating the first file to become the first master file comprises:
    nominating the first file to become the first master file based at least in part on the first file corresponding to a greatest quantity of file restores of a set of quantities of file restores within a prior time period associated with the set of files.

9. The method of claim 1, wherein the respective mapping between a non-master file of the one or more non-master files and the first master file comprises a pointer associated with an identification of a file path to the first master file.

10. The method of claim 1, further comprising:
    identifying the set of files within the file system to be restored to the hardware server; and
    identifying multi-link files within the set of files based at least in part on more than one file in the file metadata table being associated with a same device identifier and a same index node number, wherein nominating the first file to become the first master file is based at least in part on identifying the multi-link files, and wherein the multi-link files comprise at least the one or more non-master files.

11. The method of claim 10, wherein:
    the multi-link files are stored within a first partition on a storage appliance; and
    a second set of files are stored within a second partition on the storage appliance different than the first partition, the second set of files comprising non-linked files.

12. The method of claim 1, wherein a master file entry for the first file in the file metadata table is empty based at least in part on nominating the first file to become the first master file.

13. A data management system, comprising:
    a memory configured to store metadata associated with a set of files; and
    one or more processors configured to cause the data management system to perform operations comprising:
        nominating a first file of the set of files within a file system to become a first master file, the set of files comprising files to be restored to a hardware server;
        identifying remaining files in the set of files within the file system, the remaining files comprising a set of non-master files including one or more non-master files that include a pointer to the first master file;
        storing a respective mapping between each non-master file of the one or more non-master files and the first master file in a file metadata table;
        detecting a second file of the set of non-master files that includes a pointer to a second master file, the second master file not included in the set of files to be restored;
        nominating the second file to become a third master file in response to detecting that the second master file for the second file of the set of non-master files is not in the set of files to be restored;
        storing one or more second mappings between a subset of the set of non-master files and the third master file in the file metadata table based at least in part on nominating the second file to become the third master file; and
        restoring the set of files to the hardware server based at least in part on the one or more respective mappings and the one or more second mappings stored in the file metadata table.

14. The data management system of claim 13, wherein, to restore the set of files to the hardware server, the one or more processors are further configured to cause the data management system to perform operations comprising:
    restoring, to the hardware server, the first master file prior to detecting the second file that references to the second master file; and
    restoring, to the hardware server, the one or more non-master files that reference to the first master file based at least in part on a respective link between each of the one or more non-master files and the first master file, wherein the first master file and the one or more non-master files correspond to a same device identifier and a same index node number.

15. The data management system of claim 13, wherein, to restore the set of files to the hardware server, the one or more processors are further configured to cause the data management system to perform operations comprising:
  restoring the second file based at least in part on file contents of the second master file on a storage appliance, wherein, to restore the second file, the one or more processors are configured to cause the data management system to perform operations comprising:
  transferring the second file with the file contents from the storage appliance to the hardware server.

16. The data management system of claim 15, wherein the one or more processors are further configured to cause the data management system to perform operations comprising:
  creating, after restoring the second file, a respective link between each non-master file of the subset of the set of non-master files and the third master file based at least in part on the third master file and each non-master file of the subset of the set of non-master files corresponding to a same device identifier and a same index node number, wherein storing the one or more second mappings comprises storing the respective link for each non-master file of the subset of the set of non-master files in a storage system.

17. A non-transitory machine-readable medium including instructions which, when read by a system cause the system to perform operations comprising:
  nominating a first file of a set of files within a file system to become a first master file, the set of files comprising files to be restored to a hardware server;
  identifying remaining files in the set of files within the file system, the remaining files comprising a set of non-master files including one or more non-master files that include a pointer to the first master file;
  storing a respective mapping between each non-master file of the one or more non-master files and the first master file in a file metadata table;
  detecting a second file of the set of non-master files that includes a pointer to a second master file, the second master file not included in the set of files to be restored;
  nominating the second file to become a third master file in response to detecting that the second master file for the second file of the set of non-master files is not in the set of files to be restored;
  storing one or more second mappings between a subset of the set of non-master files and the third master file in the file metadata table based at least in part on nominating the second file to become the third master file; and
  restoring the set of files to the hardware server based at least in part on the one or more respective mappings and the one or more second mappings stored in the file metadata table.

18. The non-transitory machine-readable medium of claim 17, wherein, to restore the set of files to the hardware server, the instructions further cause the system to perform operations, comprising:
  restoring, to the hardware server, the first master file prior to detecting the second file that references to the second master file; and
  restoring, to the hardware server, the one or more non-master files that reference to the first master file based at least in part on a respective link between each of the one or more non-master files and the first master file, wherein the first master file and the one or more non-master files correspond to a same device identifier and a same index node number.

19. The non-transitory machine-readable medium of claim 17, wherein, to restore the set of files to the hardware server, the instructions further cause the system to perform operations, comprising:
  restoring the second file based at least in part on file contents of the second master file on a storage appliance, wherein, to restore the second file, the instructions cause the system to perform operations comprising:
  transferring the second file with the file contents from the storage appliance to the hardware server.

20. The non-transitory machine-readable medium of claim 19, wherein the instructions further cause the system to perform operations, comprising:
  creating, after restoring the second file, a respective link between each non-master file of the subset of the set of non-master files and the third master file based at least in part on the third master file and each non-master file of the subset of the set of non-master files corresponding to a same device identifier and a same index node number, wherein storing the one or more second mappings comprises storing the respective link for each non-master file of the subset of the set of non-master files in a storage system.

* * * * *